(12) United States Patent
Watanabe et al.

(10) Patent No.: US 8,297,124 B2
(45) Date of Patent: Oct. 30, 2012

(54) PRESSURE SENSOR

(75) Inventors: Jun Watanabe, Chigasaki (JP);
Masanobu Fujisaki, Hino (JP); Hisao Motoyama, Minamisoma (JP)

(73) Assignee: Seiko Epson Corporation (JP)

( * ) Notice: Subject to any disclaimer, the term of this patent is extended or adjusted under 35 U.S.C. 154(b) by 695 days.

(21) Appl. No.: 12/506,468

(22) Filed: Jul. 21, 2009

(65) Prior Publication Data
US 2010/0018318 A1    Jan. 28, 2010

(30) Foreign Application Priority Data

Jul. 22, 2008  (JP) ................................. 2008-188658
Jun. 24, 2009  (JP) ................................. 2009-150129

(51) Int. Cl.
*G01L 7/08* (2006.01)
(52) U.S. Cl. .............. 73/715; 73/720; 73/721; 73/729.2
(58) Field of Classification Search ........................ None
See application file for complete search history.

(56) References Cited

U.S. PATENT DOCUMENTS

| | | | |
|---|---|---|---|
| 4,215,570 A | 8/1980 | Eer Nisse | |
| 4,321,500 A | 3/1982 | Paros | |
| 4,372,173 A | 2/1983 | Eer Nisse et al. | |
| 4,382,385 A | 5/1983 | Paros | |
| 4,384,495 A | 5/1983 | Paros | |
| 4,406,966 A | 9/1983 | Paros | |
| 4,455,874 A | 6/1984 | Paros et al. | |
| 4,905,575 A * | 3/1990 | Knecht et al. ............. | 92/103 SD |
| 5,442,962 A * | 8/1995 | Lee ................. | 73/718 |
| 5,488,868 A | 2/1996 | Ootake et al. | |
| 6,487,911 B1 * | 12/2002 | Frackelton et al. ............. | 73/718 |
| 6,497,152 B2 | 12/2002 | Paros et al. | |
| 6,543,291 B1 * | 4/2003 | Kurtz et al. ..................... | 73/716 |
| 6,595,054 B2 | 7/2003 | Paros et al. | |
| 6,820,490 B2 * | 11/2004 | Mittelstein et al. ............. | 73/715 |
| 6,843,132 B2 | 1/2005 | Mizuno et al. | |
| 7,296,473 B2 | 11/2007 | Ishii | |
| 7,404,328 B2 | 7/2008 | Matsui | |
| 7,472,608 B2 * | 1/2009 | Hedtke ...................... | 73/861.63 |
| 7,779,700 B2 * | 8/2010 | Motoyama ...................... | 73/717 |

FOREIGN PATENT DOCUMENTS

| | | |
|---|---|---|
| CN | 2795839 Y | 7/2006 |
| JP | 54-020780 | 2/1979 |
| JP | 56-079221 | 6/1981 |
| JP | 56-119519 | 9/1981 |
| JP | 57-188137 | 11/1982 |
| JP | 60-231129 | 11/1985 |

(Continued)

*Primary Examiner* — Lisa Caputo
*Assistant Examiner* — Jermaine Jenkins
(74) *Attorney, Agent, or Firm* — Harness, Dickey & Pierce, P.L.C.

(57) ABSTRACT

A pressure sensor includes: a housing; a pressure receiver which seals an opening of the housing and transmits pressure from outside the housing to the inside of the housing; and a pressure sensing element having a pressure sensing portion and a pair of base portions which are respectively coupled to both ends of the pressure sensing portion. In the pressure sensor, a force detecting direction is set to be a detection axis, a line connecting the pair of base portions and a displacement direction of the pressure receiver are arranged in parallel, one of the base portions is coupled to a central region, which is displaced by the pressure, of the pressure receiver, and the other of the base portions is coupled to a marginal region, which is at a fixing side, of the pressure receiver through a connecting member.

10 Claims, 21 Drawing Sheets

FOREIGN PATENT DOCUMENTS

| | | |
|---|---|---|
| JP | 64-9331 | 1/1989 |
| JP | 64-86608 | 3/1989 |
| JP | 2-228534 | 9/1990 |
| JP | 7-19981 | 1/1995 |
| JP | 2003-106918 | 4/2003 |
| JP | 2004-347387 | 12/2004 |
| JP | 2005-17050 | 1/2005 |
| JP | 2005-106527 | 4/2005 |
| JP | 2005-106528 | 4/2005 |
| JP | 2005-121628 | 5/2005 |
| JP | 2006-194736 | 7/2006 |
| JP | 2007-57395 | 3/2007 |
| JP | 2007-132697 | 5/2007 |
| JP | 2008-070241 | 3/2008 |
| JP | 2008-232886 | 10/2008 |

* cited by examiner

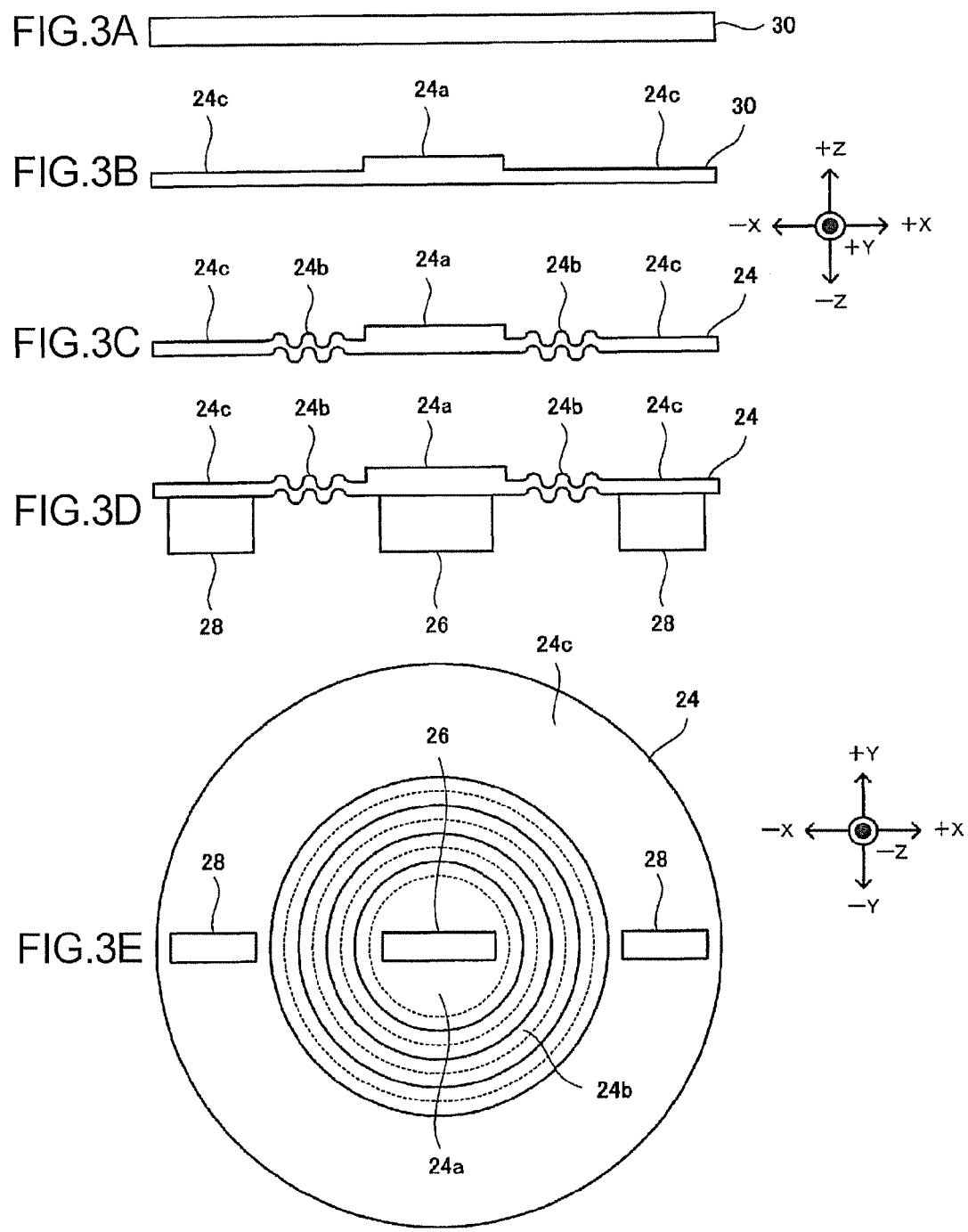

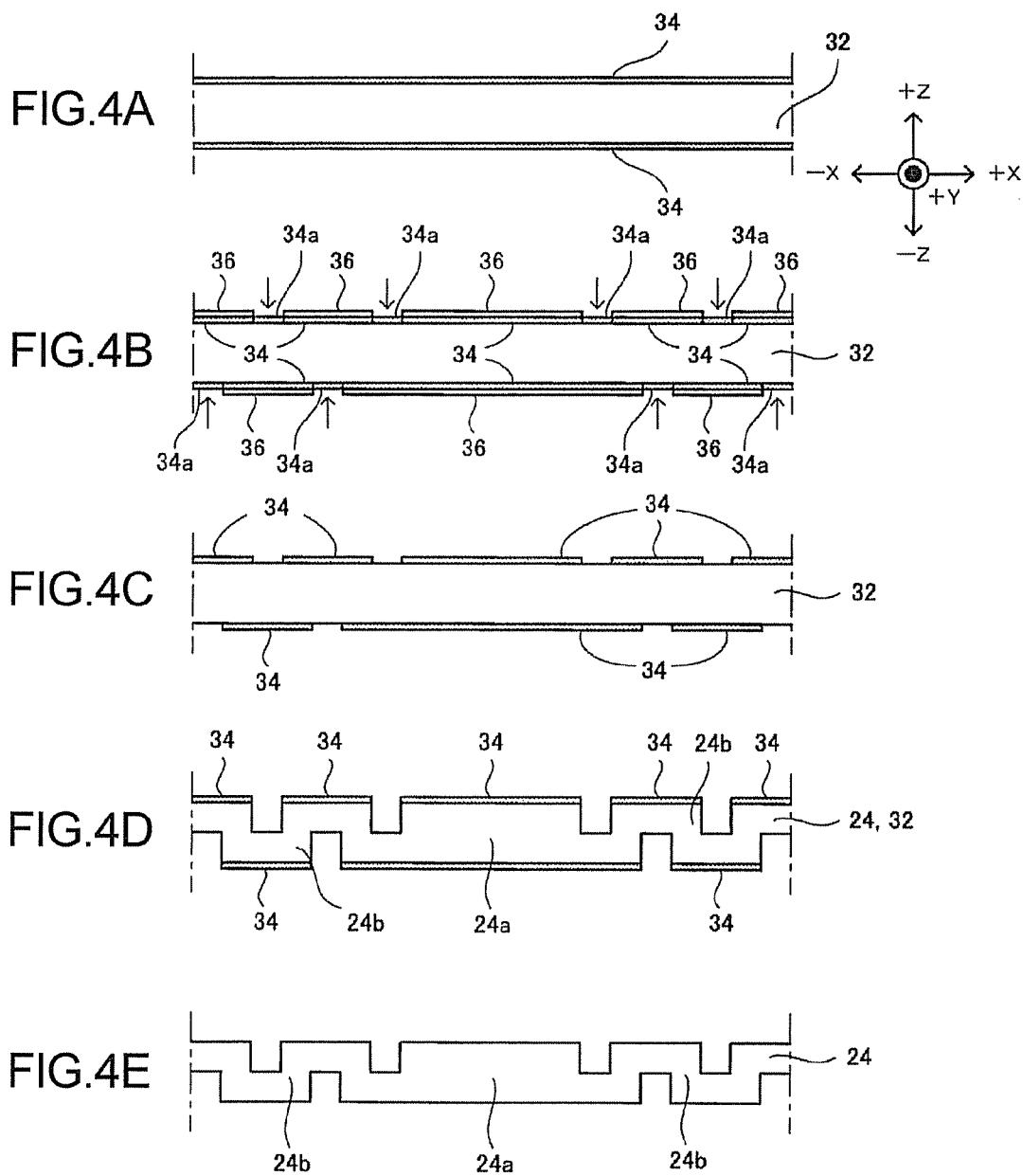

FIG.6A
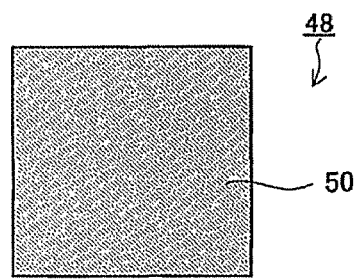
FIG.6B
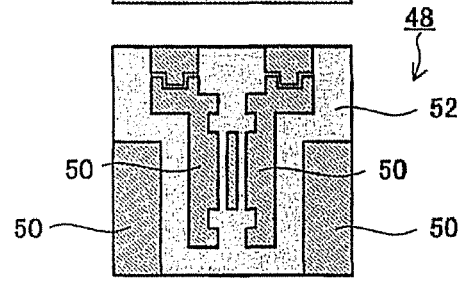
FIG.6C
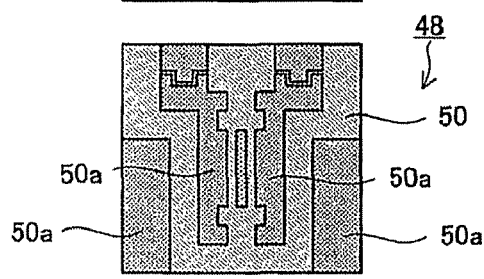
FIG.6D
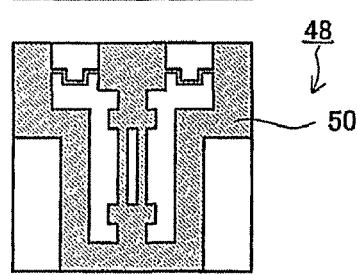
FIG.6E
FIG.6F
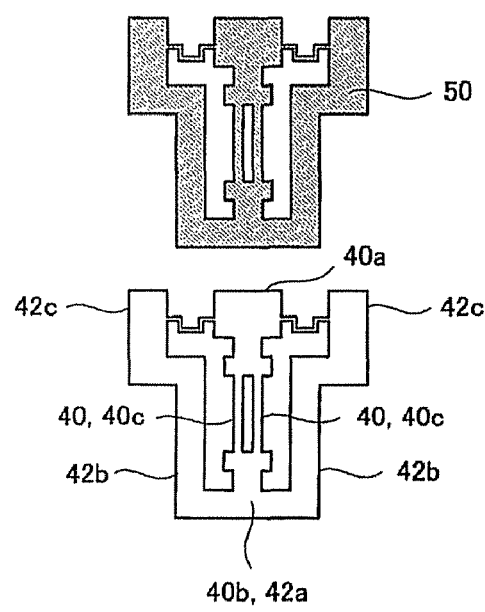

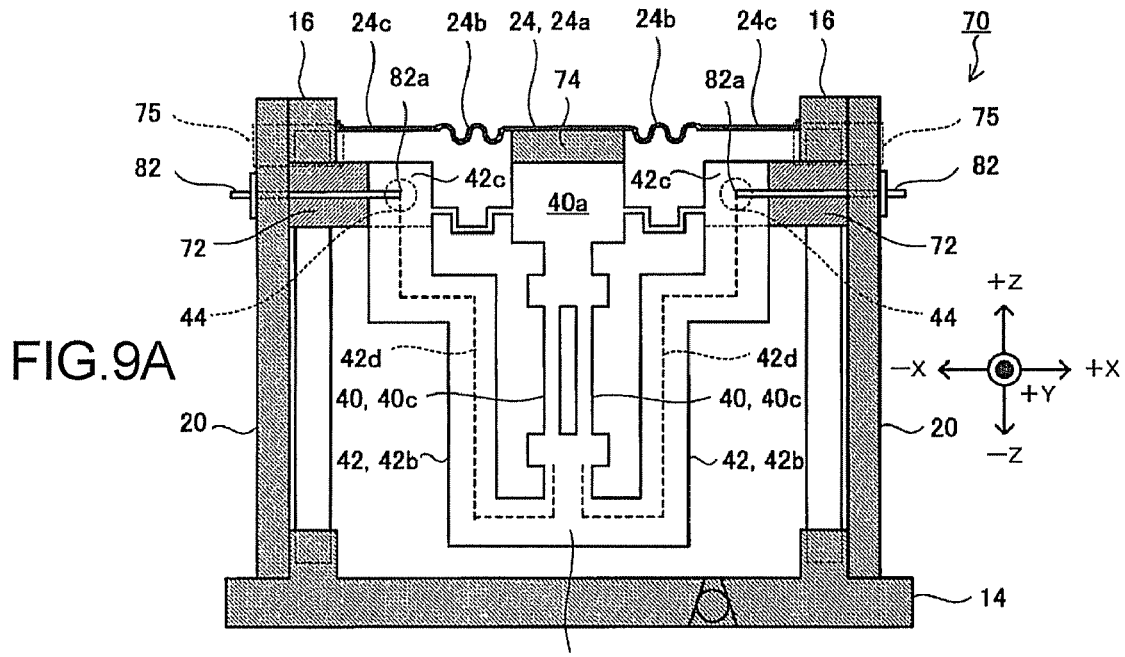
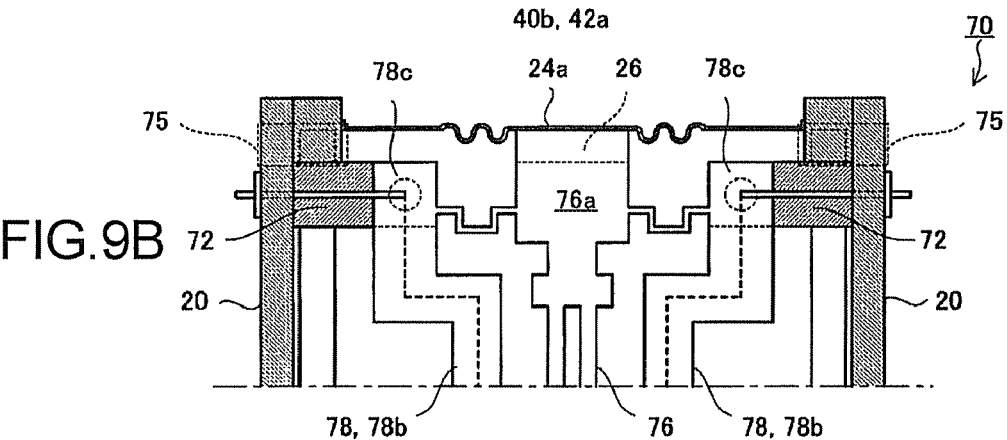
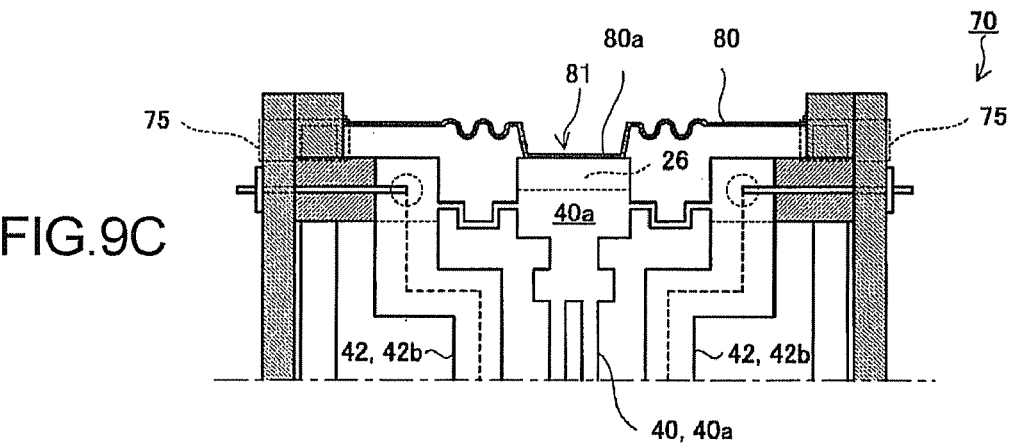
FIG.9A
FIG.9B
FIG.9C

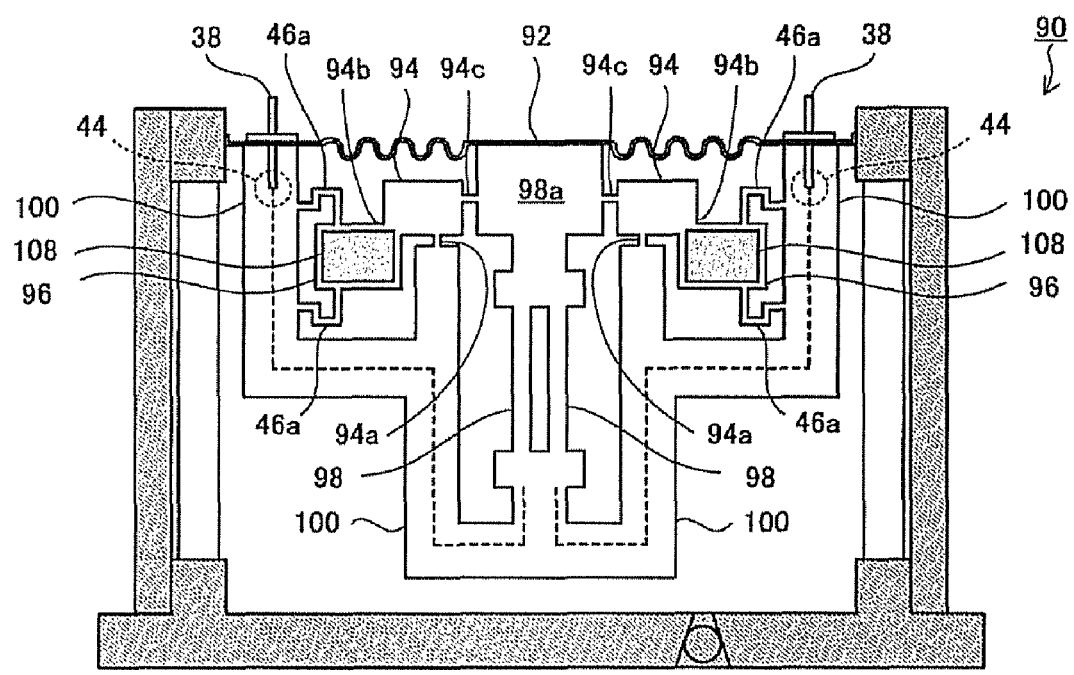
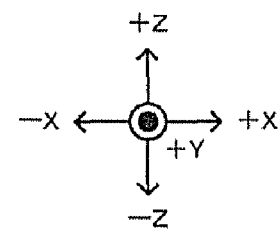
FIG.10

PRESSURE SENSOR

RELATED APPLICATIONS

This application claims priority to Japanese Patent Application No. 2008-188658 filed Jul. 22, 2008 and Japanese Patent Application No. 2009-150129 filed Jun. 24, 2009 which are hereby expressly incorporated by reference herein in their entirety.

BACKGROUND OF THE INVENTION

1. Field of the Invention

The present invention relates to a pressure sensor using a pressure sensing element and a diaphragm. Especially, the present invention relates to a technique for reducing an error in a pressure measurement value of a pressure sensor, which is accompanied by temperature change and caused by a combination of different kinds of materials; and an error in a pressure measurement value, which is caused by flexure of a diaphragm due to gravity force.

2. Invention of Related Art

Pressure sensors that include a piezoelectric resonator element as a pressure sensing element are known as a water pressure gauge, an air gauge, a differential pressure gauge, or the like. The piezoelectric resonator element includes, for instance, a planar piezoelectric substrate on which an electrode pattern is formed, and a detection axis is set to be a direction in which force is detected. When pressure is applied in the direction of the detection axis, a resonance frequency of the piezoelectric resonator changes and the pressure is detected from the change of the resonance frequency. Japanese Unexamined Patent Application Publication No. 2007-57395 discloses a pressure sensor according to a first related art. FIG. 21 shows the pressure sensor according to the first related art. This pressure sensor 201 according to the first related art includes: an airtight case 202; a first pressure input orifice 203a; a second pressure input orifice 204a; a first bellows 210; a second bellows 211; a resonator element adhesive pedestal 215; a piezoelectric resonator element 220; a piezoelectric reinforcing plate 221; and an oscillation circuit 230. The inside of the airtight case 202 is vacuumed or the airtight case 202 contains inert atmosphere therein. The first and second pressure input orifices 203a and 204a are respectively formed on a first wall 203 and a second wall 204, which are opposed to each other, of the airtight case 202 in a manner to respectively penetrate the walls 203 and 204. The first bellows 210 has a cylindrical shape of which an opening at one end is fixed to the first wall 203 and has an axis hole communicating with the first pressure input orifice 203a. The second bellows 211 has a cylindrical shape of which an opening at one end is fixed to the second wall 204, has an axis hole communicating with the second pressure input orifice 204a, and is disposed in series with the first bellows 210. The resonator element adhesive pedestal 215 is disposed and fixed between the other ends 210a and 211a of the first and second bellows 210 and 211. The piezoelectric resonator element 220 has a thin plate shape and is supported by the resonator element adhesive pedestal 215. The piezoelectric reinforcing plate 221 is disposed to be opposed to the piezoelectric resonator element 220 with the second bellows 211 therebetween. The oscillation circuit 230 communicates with an electrode pattern formed on the piezoelectric resonator element. The piezoelectric resonator element 220 is fixed to the second wall 204 at its one end and fixed to the resonator element adhesive pedestal 215 at the other end. The piezoelectric reinforcing plate 221 is fixed to the second wall 204 and the resonator element adhesive pedestal 215 at its respective ends. The resonator element adhesive pedestal 215 and an inner wall of the airtight case 202 are fixed to each other by a reinforcing plate spring so as to increase durability against impact in X-axis direction.

The piezoelectric resonator element 220 has a structure in which an electrode is formed on a quartz crystal substrate, for example. The resonator element adhesive pedestal 215 includes a base portion 215a which is fixed in a manner to be sandwiched by the other ends 210a and 211a of the bellows 210 and 211 and a supporting piece 215b protruding from a circumference of the base portion 215a toward the second wall. The other ends of the piezoelectric resonator element 220 and the piezoelectric reinforcing plate 221 are both connected to the supporting piece 215b.

The pressure input orifices 203a and 204a are respectively communicated with the axis holes of the inside of the bellows 210 and 211, while the axis holes in the bellows are maintained at a state that they are not communicated with each other due to the base portion 215a of the resonator element adhesive pedestal 215. Therefore, a position of the resonator element adhesive pedestal 215 is moved forward and backward in an axis direction of the bellows due to expansion and contraction of the bellows generated by pressure difference between pressure P1 and pressure P2 which are respectively inputted from the pressure input orifices 203a and 204a. The piezoelectric resonator element 220 fixed to the resonator element adhesive pedestal 215 at its one end and fixed to the second wall 204 at the other end receives mechanical stress in the axis direction due to pressure transmitted from the resonator element adhesive pedestal 215 so as to deform, changing natural resonance frequency. That is, an excitation electrode is energized in a state that the oscillation circuit 230, which is disposed on an appropriate position of the airtight case 202 in an airtight state, and the excitation electrode, which constitutes the piezoelectric resonator element 220 and is formed on a piezoelectric substrate, are coupled so as to vibrate the piezoelectric substrate, and pressure P1 and pressure P2 are calculated based on an output frequency at this time.

According to the pressure sensor 201 of the first related art, when pressure P1 is inputted into the first pressure input orifice 203a, force corresponding to the pressure is applied to the piezoelectric resonator element 220 and the piezoelectric reinforcing plate 221. Because of an existence of the piezoelectric reinforcing plate 221, only force in a longitudinal direction (Y-axis direction in the drawing in a case of a quartz crystal resonator element) is applied to the piezoelectric resonator element 220, and therefore primary pressure-frequency property of the piezoelectric resonator element exhibits a quadratic curve. Accordingly, the resonance frequency of the piezoelectric resonator element 220 changes in a linear fashion while corresponding to pressure P1, being able to obtain the pressure sensor 201 with high accuracy.

Japanese Unexamined Patent Application Publication No. 2002-214058 discloses a pressure sensor 300 according to a second related art. FIG. 22 shows the pressure sensor 300 according to the second related art. The pressure sensor 300 according to the second related art has a structure in which a silicon structure 305 including a diaphragm 309 is bonded to a base body 306 provided with an electrode 307 and a dielectric layer 308 in such a manner that the diaphragm 309 is opposed to the electrode 307 and a gap 310 is formed between the diaphragm 309 and the dielectric layer 308. The electrode 307 is composed of a metal thin film. The dielectric layer 308 is formed to cover the electrode 307. The diaphragm 309 can deform in response to pressure and has conductivity. With such the structure, the pressure can be detected by detecting change in capacitance accompanied by change of a contacting area, in which the diaphragm 309 contacts with the dielectric layer 308 by receiving pressure.

However, in the invention of Japanese Unexamined Patent Application Publication No. 2007-57395, it is difficult to match linear expansion coefficients of the piezoelectric resonator element 220 and the airtight case 202. Accordingly, stress applied on the piezoelectric resonator changes when a temperature changes, and this stress change due to the temperature change brings an error in a pressure measurement value. The bellows is used so as the pressure measurement value to be hardly influenced by the linear expansion coefficient in Japanese Unexamined Patent Application Publication No. 2007-57395, but the bellows can not completely eliminate the influence of the linear expansion coefficient.

Further, in the invention of Japanese Unexamined Patent Application Publication No. 2002-214058, the diaphragm 309 receives force in a direction approaching the base body 306 due to gravity of the earth. In addition, if the pressure sensor 300 is disposed in an inverted manner, the diaphragm 300 receives force in a direction leaving from the base body 306 due to the gravity of the earth. Accordingly, the pressure sensor 300 is originally intended to detect pressure of gas or liquid, but an error in a pressure measurement value arises depending on its disposed posture.

SUMMARY OF THE INVENTION

In view of the above problems, the present invention is intended to provide a highly accurate pressure sensor which reduces an error in a pressure measurement value, which is caused by use of materials having different linear expansion coefficients from each other; and an error in a pressure measurement value, which is caused by change in application of gravity acceleration.

The present invention has been achieved to solve at least a part of the problems described above, and can be realized as the following application examples.

Application Example 1

A pressure sensor includes: a housing; a pressure receiving means (pressure receiver) sealing an opening of the housing and including a flexible portion of which one main surface is a pressure receiving surface, and a marginal region positioned outside the flexible portion; and a pressure sensing element including a pressure sensing portion, a first base portion, and a second base portion. The first base portion and the second base portion are respectively connected to both ends of the pressure sensing portion and arranged in a direction parallel to a displacement direction of the pressure receiving means. In the pressure sensor, the first base portion is coupled to a central region, which is a reverse side of the pressure receiving surface, of the pressure receiving means and the second base portion is coupled to one of the marginal region of the reverse side and an inner wall, which is opposed to the first base portion, of the housing, through a connecting means (connector).

According to the above structure, the first base portion disposed at one end of the pressure sensing element in a detection axis direction is coupled to the central region, which is displaced by pressure from the outside, of a diaphragm, and the second base portion disposed at the other end, which is an opposite end to the one end, is coupled to the marginal region, which is fixed to the housing and is not displaced by pressure from the outside, of the diaphragm through the connecting means. Accordingly, a pressure sensor, in which the pressure sensing element receives compressive stress by pressure from the outside, measures absolute pressure. Further, the both ends of the pressure sensing element are coupled to the diaphragm, being able to prevent an error in a pressure amount measurement value, which is accompanied by temperature change and caused by different linear expansion coefficients of the pressure sensing element and the housing made of different materials from each other.

In addition, according to the above structure, the first base portion of the pressure sensing element is coupled to the central region, which is displaced by pressure from the outside, of the diaphragm, and the second base portion is coupled to the inner wall of the housing which is opposed to the first base portion, that is, coupled to the inner wall, at a diaphragm side, of the housing which is not displaced by pressure from the outside. Accordingly, since the second base portion of the pressure sensing element is coupled to the diaphragm side of the housing, a problem caused by mismatch in the linear expansion coefficients described above hardly arises or does not arise. In addition, the pressure sensing element is fixed to the housing which has high rigidity, obtaining rigidity between the pressure sensing element and the housing. Consequently, the pressure sensor which secures force transmission from the diaphragm to the pressure sensing element and thus has stable sensitivity can be obtained.

Application Example 2

In the pressure sensor according to Application Example 1, the connecting means has a pair of supporting plates extending from the second base portion in a manner to sandwich the pressure sensing portion.

Accordingly, the pressure sensing element does not bend toward a connecting means side, so that the pressure sensing element can be prevented from moving in directions other than the detection axis direction. Thus the sensitivity of the pressure sensing element in the detection axis direction can be improved, providing a highly accurate pressure sensor.

Application Example 3

In the pressure sensor according to Application Example 1 or 2, the first base portion is coupled to a fixing part provided to a center of the flexible portion.

Accordingly, the pressure sensing element can easily fixed to the flexible portion. In addition, since the pressure sensing element at a second base portion side does not bend in a normal line direction of a main surface which is formed by the pressure sensing element and the connecting means, the pressure sensing element can be prevented from moving in directions other than the detection axis direction. Thus, sensitivity of the pressure sensing element in the detection axis direction can be improved, providing a highly accurate pressure sensor.

Application Example 4

In the pressure sensor according to any one of Application Examples 1 to 3, the first base portion is coupled to the connecting member through a reinforcing part.

Because of this, in a case where the pressure sensing element and the connecting member are formed in an integrated manner, the pressure sensing element can be prevented from being broken off when being mounted. Accordingly, the process yield can be improved and the cost reduction of the pressure sensor can be achieved.

Application Example 5

The pressure sensor according to any one of Application Examples 1 to 4 further includes a reaction force generating part coupled to the pressure receiving means and applying force in a direction reverse to gravity force, which is applied to the pressure receiving means, to the pressure receiving means by using a weight under the principle of leverage.

Because of this, stress accompanied by displacement caused by gravity force which is applied to the pressure receiving means is cancelled by the weight. Accordingly, the pressure sensing element does not receive stress from the pressure receiving means described above, providing a highly accurate pressure sensor which reduces an error in a pressure measurement value caused by change in application of gravity acceleration.

Application Example 6

In the pressure sensor according to Application Example 5, the reaction force generating part is formed in a paired manner to sandwich the pressure sensing element. Because of this, gravity force balance of the pressure sensing element is maintained and a measurement error of the pressure sensor due to tilt angle dependency is suppressed. Further, stress other than stress which is applied to the pressure sensing element in the detection axis direction by the pair of reaction force generating part is cancelled, providing a further highly accurate pressure sensor.

Application Example 7

In the pressure sensor according to Application Example 5 or 6, a metal film is disposed on a surface of the weight. Thus the metal film is disposed after formation of the weight, so that chances for adjusting a weight of a weight side are increased. In addition, the weight of the weight side is fine adjusted by disposing the metal film of an appropriate amount, being able to easily adjust the balance between the weight and the pressure receiving means. Further, the metal film can be peeled off after the metal film is disposed, so that chances for adjusting the weight of the weight side are further increased. In addition, the metal film can be peeled off by a leaser beam or the like, so that the weight of the weight side can be adjusted even after the manufacturing of the pressure sensor in a case where the housing or the diaphragm is made of a material through which a leaser beam can passes, improving yield of the pressure sensor.

Application Example 8

In the pressure sensor according to any one of Application Examples 1 to 4, the housing is integrally formed by metal squeezing.

Since the housing according to Application Examples 1 to 4 does not have any contact points with the components described above except for at the marginal region of the pressure receiving means and at the lateral surface of the housing at the pressure receiving means side. Therefore, the housing can be formed integrally and thus the structure and the manufacturing process are simplified, being able to achieve cost reduction.

Application Example 9

In the pressure sensor according to any one of Application Examples 1 to 7, the housing includes a second opening formed opposed to the opening and sealed by a second pressure receiving means, and the pressure receiving means and the second pressure receiving means are coupled to each other through a force transmission shaft.

Accordingly, in a case where pressure at a first pressure receiving means side is high, the pressure sensing element receives compressive stress, while, in a case where pressure at a second pressure receiving means side is high, the pressure sensing element receives extensional stress. Accordingly, the pressure sensor, according to Application Examples 1 to 7, which measures absolute pressure, can be formed as a pressure sensor which can measure relative pressure.

BRIEF DESCRIPTION OF THE DRAWINGS

FIGS. 3(a)-3(e) are diagrams showing a process of pressing a diaphragm according to the first embodiment.

FIGS. 4(a)-4(e) are diagrams showing a process of photolithography-etching a diaphragm according to the first embodiment.

FIGS. 6(a)-6(f) are diagrams showing a process of photolithography-etching a pressure sensing element and the like according to the first embodiment.

FIGS. 9(a)-9(c) are sectional views showing the pressure sensor according to the second embodiment and also showing modifications.

FIG. 10 is a sectional view showing a pressure sensor according to a third embodiment.

DESCRIPTION OF PREFERRED EMBODIMENTS

A pressure sensor according to the invention will be circumstantially described below with reference to embodiments shown in the accompanying drawings. Note that elements, kinds, combinations, shapes, relative positions, and the like described in the embodiments do not limit the range of this invention, but are only examples unless the description gives a specific statement.

Figure 1:
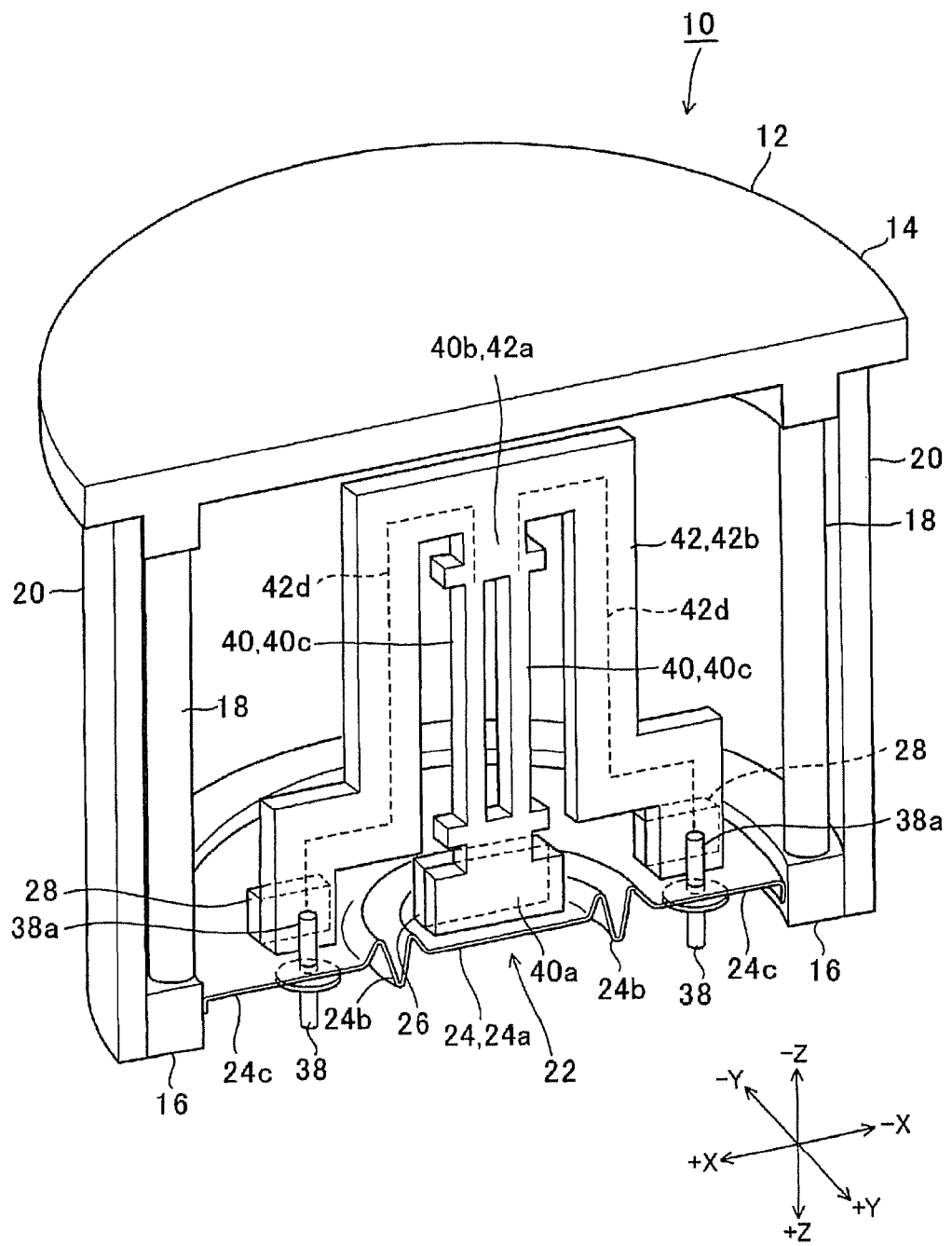
FIG. 1 is a perspective view showing a pressure sensor according to a first embodiment.
Figure 2A:
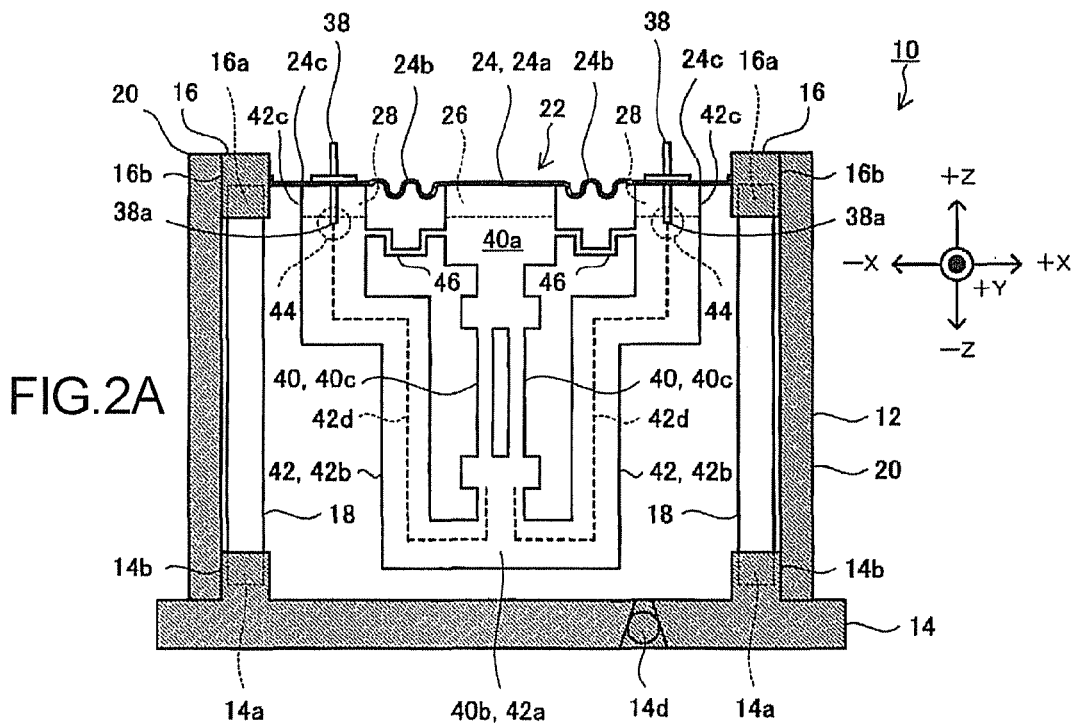
FIGS. 2(a) and 2(b) are sectional views showing the pressure sensor according to the first embodiment.
Figure 2B:
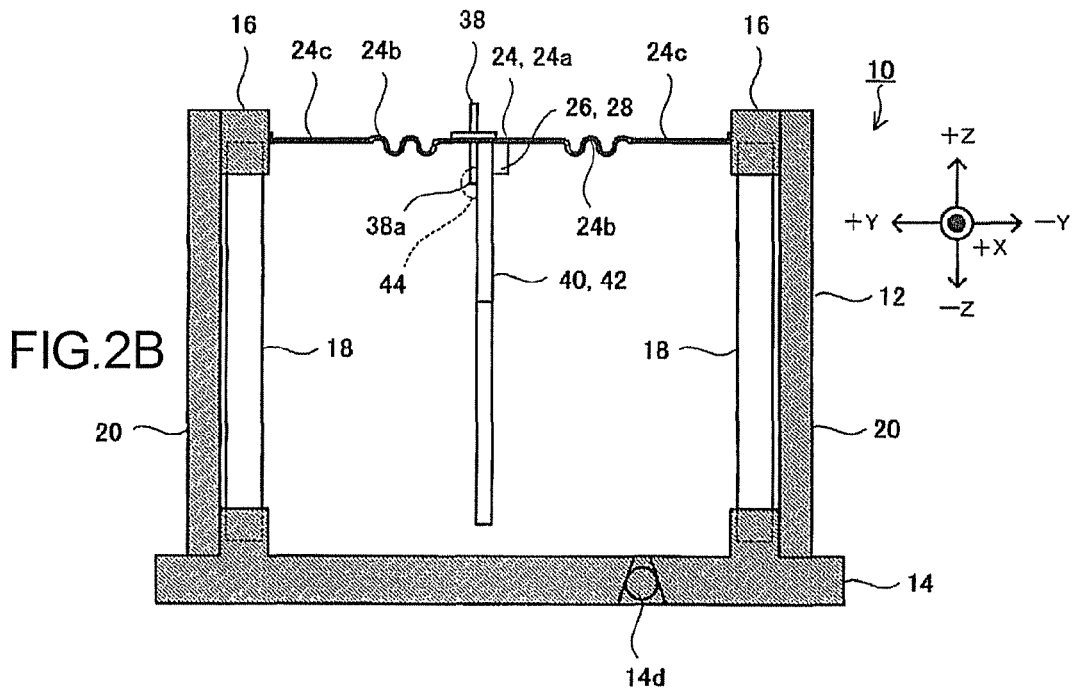

FIG. 1 is a perspective view showing a pressure sensor according to a first embodiment (XZ plane is set to be a section) and FIG. 2 is a sectional view showing the same (the XZ plane is set to be a section in FIG. 2(a) and YZ plane is set to be a section in FIG. 2(b)). Here, X, Y, and Z shown in FIGS. 1 and 2 constitute an orthogonal coordinate system, and this is same in the drawings referred hereinafter. A pressure sensor 10 according to the first embodiment includes: a housing 12, a diaphragm 24 serving as a pressure receiving means, a pressure sensing element 40, a connecting member 42 serving as a connecting means, and a reinforcing part 46 (not shown in FIG. 1). The housing 12 is sealed and the inside thereof is vacuumed. The pressure sensor 10 measures absolute pressure based on vacuum.

The housing 12 is sealed to store later-described components in such a manner that the inside thereof is vacuumed. Accordingly, in the pressure sensor 10, a Q value of the pressure sensing element can be increased and a stable resonance frequency can be maintained, thus being able to secure long period of stability of the pressure sensor 10.

The housing 12 includes a flange portion 14 having a circular shape, a hermetic terminal portion 16 having a circular shape, a supporting shaft 18, and a lateral surface portion 20 having a cylindrical shape. On predetermined positions of surfaces, which are opposed to each other, of the flange portion 14 and the hermetic terminal portion 16, dowel holes 14a and 16a for insetting the supporting shaft 18 thereto are respectively formed. The dowel hole 14a and the dowel hole 16a are formed on positions which are opposed to each other. Therefore, the flange portion 14 and the hermetic terminal portion 16 are coupled to each other through the supporting shaft 18 by insetting the supporting shaft 18 into the dowel holes 14a and 16a. The supporting shaft 18 is a stick-like member having a longitudinal direction in ±Z direction and having certain rigidity. The supporting shaft 18 is disposed inside the housing 12, and one end and the other end thereof are respectively inset into the dowel hole 14a of the flange portion 14 and the dowel hole 16a of the hermetic terminal portion 16 so as to obtain the certain rigidity among the flange portion 14, the supporting shaft 18, and the hermetic terminal portion 16. Here, a plurality of the supporting shafts 18 is used and they are arbitrarily arranged in accordance with a design of positions of the dowel holes.

The lateral portion 20 seals the housing 12 at the lateral surface of the housing 12, and is connected to a medially-positioned circumference 14b of the flange portion 14 and a circumference 16b of the hermetic terminal portion 16 (having the same diameter as that of the circumference 14b). It is preferable that the flange portion 14, the hermetic terminal portion 16, and the lateral surface portion 20 be made of metal such as stainless-steel, and the supporting shaft 18 have certain rigidity and be made of ceramic, for example, having a small thermal expansion coefficient.

The hermetic terminal portion 16 has a circular opening 22 at its center, and is connected with the diaphragm 24 which seals the opening 22.

One main surface, which faces the outside of the housing 12, of the diaphragm 24 is a pressure receiving surface. The pressure receiving surface has a flexible portion which receives pressure of pressure measured environment to bend and deform. The diaphragm 24 transmits compression force or tensile force to the pressure sensing element 40 in accordance with bend and deformation of the flexible portion toward the inside of the housing 12. The diaphragm 24 includes the flexible portion composed of a central region 24a and a flexible region 24b, and a marginal region 24c. The central region 24a is displaced by pressure from the outside. The flexible region 24b is formed at a circumference of the central region 24a and bends and deforms by pressure from the outside. The marginal region 24c is formed outside the flexible portion, that is, at a circumference of the flexible region 24b, and is bonded and fixed to an inner wall of the opening 22 which is formed in the hermetic terminal portion 14. To the central region 24a of the diaphragm 24 in a reverse surface of the pressure receiving surface, one end, in the longitudinal direction (a detection axis direction), of the pressure sensing element which is described later is coupled. Further, to the central region 24a in the reverse surface of the pressure receiving surface, a fixing part 26 is bonded by adhesive or the like, and one end of the pressure sensing element 40 which is described later is coupled to the fixing part 26 with the adhesive or the like. Furthermore, to the marginal region 24c of the diaphragm 24 in the reverse surface of the pressure receiving surface, a pair of fixing parts 28 is connected with adhesive or the like. The fixing parts 28 are formed with an interval corresponding to upper end portions 42c of the connecting member 42, which is described later, and fix the upper end portions 42c with adhesive or the like therebetween. Here, it is preferable that the fixing part 26 and the fixing parts 28 be made of the same material as that of the diaphragm 24.

The diaphragm 24 is preferably made of a material having corrosion resistance, for example, metal such as stainless-steel or ceramic, or may be a single crystalline body such as quartz crystal or other amorphous body. In a case where the diaphragm 24 is made of metal, the diaphragm may be formed by pressing a metal base member.

In the case where the diaphragm 24 is made of metal, the metal base member (not shown) may be pressed from its both surfaces by a pair of ribbed pressing plates (not shown) having concave portions (not shown) which correspond to concentric circular shapes of the flexible region 24b of the diaphragm 24.

FIGS. 3(a) to 3(e) are schematic views showing the case where the diaphragm is made of metal. Here, FIG. 3(e) is a bottom view of FIG. 3(d). In order to suppress vibration of the diaphragm 24 caused by vibration of the pressure sensing element 40, the central region 24a of the diaphragm 24 is favorably formed thicker than other regions. In this case, a metal base member 30 is prepared (FIG. 3(a)), half-etching is performed in a manner leaving the central region 24a (FIG. 3(b)), and the metal base member 30 on which the etching is performed is pressed by a pair of pressing plates (not shown) having a shape corresponding to shapes of the central region 24a, the flexible region 24b, and the marginal region 24c so as to form the diaphragm 24 (FIG. 3(c)). After that, the fixing parts 26 and 28 are bonded to predetermined positions of the diaphragm 24 with adhesive or the like (FIG. 3(d) and FIG. 3(e)).

FIG. 4 is a schematic view showing a case where the diaphragm is made of quartz crystal. In the case where the diaphragm 24 is made of quartz crystal, it is preferable that the diaphragm 24 be formed by photolithography-etching in a similar manner. In this case, the diaphragm 24 is formed by: preparing a base substrate 32 to be a material and applying a positive type photo-resist 34 on a surface of the base substrate 32 (FIG. 4(a)); exposing the photo-resist 34 to light by using a photo-mask 36 corresponding to an arrangement and shapes of the central region 24a, the flexible region 24b, and the marginal region (not shown) so as to photosensitize the photo-resist 34 (FIG. 4(*b*)); performing development so as to remove the photo-resist 34*a* which is photosensitized (FIG. 4(*c*)); half-etching a region on which the base substrate 32 is exposed so as to form the central region 24*a*, the flexible region 24*b*, and the marginal region (not shown) in an integrated manner (FIG. 4(*d*)); and peeling off the photo-resist 34 (FIG. 4(*e*)).

Figure 5A:
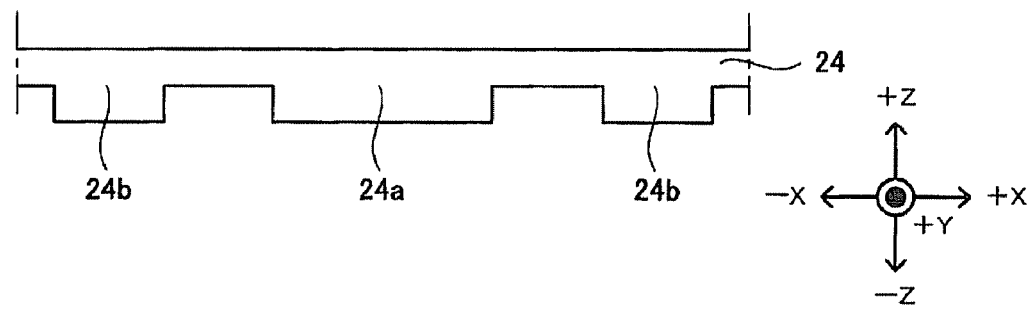
FIGS. 5(a) and 5(b) show modifications of the process of photolithography-etching a diaphragm.
Figure 5B:
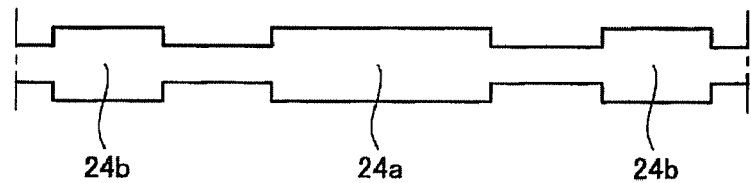

As modifications of photolithography-etching of the diaphragm 24, it is preferable that etching be performed on only one surface so as to form the flexible region 24*b* as shown in FIG. 5(*a*), and it is also preferable that etching be performed on a surface and a reverse surface of the flexible region 24*b* at positions corresponding to each other on the surfaces as shown in FIG. 5(*b*).

Here, a surface, which is exposed to the outside, of the diaphragm 24 may be coated so as not to be eroded by liquid, gas, or the like. For example, a diaphragm made of metal may be coated by a nickel compound, and a diaphragm composed of a piezoelectric crystal body such as quartz crystal may be coated by silicon.

As shown in FIG. 1 and FIG. 2, a hermetic terminal 38 is provided on the marginal region 24*c* of the diaphragm 24 which faces the outside of the housing 12. The hermetic terminal 38 is disposed in such a manner that an interval between an end portion 38*a* thereof and the fixing part 28 is approximately same as the thickness of the connecting member (pressure sensing element) which is described later, that is, the terminal 38 is positioned so as to be able to sandwich the connecting member by the end portion 38*a* thereof together with the fixing part 28. The hermetic terminal 38 is capable of electrically connecting an electrode part of the pressure sensing element which is described later and an oscillating circuit (not shown), which is disposed at the outside of the housing, of the pressure sensing element.

The pressure sensing element 40 may be made of a piezoelectric material such as quartz crystal, lithium niobate, and lithium tantalite. The pressure sensing element 40 includes a pressure sensing portion and a pair of base portions respectively connected to both ends of the pressure sensing portion. In the pressure sensing element 40, a force detection direction is set as a detection axis, and a direction in which the pair of the base portions of the pressure sensing element 40 is arranged is parallel to the detection axis. In a case of a tuning fork type piezoelectric resonator, a direction in which a beam serving as a vibration arm extends and the detection axis are parallel to each other.

The tuning fork type resonator includes a pair of base portions (a first base portion 40*a* and a second base portion 40*b*) serving as fixing ends at both ends of vibration arms 40*c* serving as pressure sensing parts and two vibration beams (the vibration arms 40*c*) are formed between the two base portions. The tuning fork type resonator has such a property that when tensile stress (extensional stress) or compressive stress is applied to the two vibration beams serving as the pressure sensing parts (the vibration arms 40*c*), resonance frequency changes approximately in proportion to the applied stress.

The pressure sensing element 40 is disposed such that the longitudinal direction thereof, that is, a direction in which the first base portion 40*a* and the second base portion 40*b* are arranged is set to be coaxial with or parallel to a displace direction of the diaphragm 24, and the displace direction is set as the detection axis. The first base portion 40*a* of the pressure sensing element 40 is fixed to the fixing part 26 and contacts with the central region 24*a* of the diaphragm 24, and the second base portion 40*b* disposed at the opposite side of the first base portion 40*a* across the vibration arm 40*c* is formed in a manner to be integrated with the connecting member 42 which is described later. The first base portion 40*a* is fixed to the fixing part 26, so that the pressure sensing element 40 can be easily fixed to the central region 24*a* of the flexible portion. Further, since a second base portion 40*b* side of the pressure sensing element 40 and a second base portion side of connecting member 42 which is described later do not bend in a normal line direction (±Y direction) of a main surface formed by the pressure sensing element 40 and the connecting member 42, the pressure sensing element 40 can be prevented from moving in directions other than the detection axis direction, being able to improve sensitivity of the pressure sensing element 40 in the detection axis direction. Thus the pressure sensor 10 is highly accurate.

The pressure sensing element 40 is electrically connected with the oscillation circuit (not shown) which is described above, and vibrates at a natural resonance frequency in response to alternating voltage supplied from the oscillation circuit. The resonance frequency of the pressure sensing element 40 changes when the pressure sensing element 40 receives extensional stress or compressive stress from the longitudinal direction thereof. Especially, resonance frequency of the tuning fork type piezoelectric resonator element changes substantially largely with respect to the extensional and compressive stress and therefore variable width of the resonance frequency is large, compared to resonators such as a thickness shear resonator. Therefore, a tuning fork type resonator element is suitable for a pressure sensor having excellent resolution ability such as an ability of detecting a slight pressure difference. When the tuning fork type piezoelectric resonator receives extensional stress, amplitude of the vibration arm (vibration unit) is decreased, thereby increasing the resonance frequency. When the resonator receives compressive stress, amplitude of the vibration arm (vibration unit) is increased, thereby decreasing the resonance frequency. In the embodiment, only compressive stress is received so as to measure absolute pressure.

In the present embodiment (similarly in the following embodiments), not only the pressure sensing part having two vibration beams but also a pressure sensing part having a single vibration beam (single beam) is applicable. In a case where the pressure sensing part (vibration arm 40*c*) composed of a single beam receives certain stress, the displacement thereof is double, providing the pressure sensor having higher sensitivity than the tuning fork type. A piezoelectric substrate of the tuning fork type or single beam type piezoelectric resonator is preferably made of quartz crystal which has excellent temperature characteristics.

The connecting member 42 connects the second base portion 40*b* positioned at the other end at the opposite side (base portion which is not directly connected to the diaphragm 24) to the first base portion 40*a*, which is positioned at one end of the pressure sensing element 40 in the longitudinal direction, with the fixing part 28 disposed at the marginal region 24*c* of the diaphragm 24. The connecting member 42 is symmetrically formed in a paired manner to sandwich the pressure sensing element 40. That is, the connecting member 42 is formed in a U shape as a whole. The second base portion 40*b* of the pressure sensing element 40 is integrated with a saddle 42*a* of the U shape, and the upper end portions 42*c* of the pair of the supporting plates 42*b* which form the U shape are connected to the fixing parts 28 in a manner to contact with the marginal region 24*c*. The connecting member 42 is provided with extracted wiring 42*d* extending from an excitation electrode (not shown) formed on the vibration arm 40*c* of the pressure sensing element 40. The extracted wiring 42*d* is formed to extend up to the upper end portion 42c, and further, extend to a position on which the wiring 42d contacts with the end portion 38a of the hermetic terminal or a position on which the wiring 42d is close to the end portion 38a. The extracted wiring 42d and the end portion 38a are bonded to each other with a conductive adhesive 44 so as to be electrically connected to each other. Accordingly, wiring (not shown) from the oscillation circuit (not shown), which is disposed at the outside of the housing 12, of the pressure sensing element 40 and the extracted wiring 42d can be electrically connected with each other. Therefore, the pressure sensing element 40 is electrically connected with the oscillation circuit (not shown) and thus alternating voltage is applied from the oscillation circuit (not shown) to the excitation electrode (not shown) of the vibration arm 40c, whereby the vibration arm 40c can vibrate at a predetermined resonance frequency.

The vicinity of the first base portion 40a of the pressure sensing element 40 and the vicinity of the upper end portion 42c of the connecting member 42 are coupled to each other by the reinforcing part 46. The reinforcing part 46 is used for preventing the pressure sensing element 40 from breaking in manufacturing and mounting thereof. The reinforcing part 46 is designed thinner than the pressure sensing element 40 and the connecting member 42 so as not to prevent displacement of the pressure sensing element 40 with respect to stress, and designed to have a spring property, such as in the shape of a coronoid. Since the reinforcing part 46 is intended to prevent a damage of the pressure sensing element 40 in the mounting and the like, the reinforcing part 46 may be broken off as shown in FIG. 1 after the mounting.

In a case where the pressure sensing element 40, the connecting member 42, and the reinforcing part 46 are respectively made of quartz crystal, they are preferably formed by photolithography-etching as an integrated body.

FIG. 6 is a process diagram showing the photolithography-etching for the pressure sensing element and the like in the first embodiment. A case of forming the pressure sensing element 40, the connecting member 42, and the reinforcing part 46 in an integrated manner by the photolithography-etching has the following process including steps (1) to (6) as shown in FIG. 6: (1) preparing a base substrate 48 to be a material and applying a positive type photo-resist 50 on a surface of the base substrate 48 (FIG. 6(a)); (2) exposing to light with using a photo-mask 52 corresponding to an arrangement and shapes of the pressure sensing element 40, the connecting member 42, and the reinforcing part 46 (FIG. 6(b)); (3) photosensitizing the photo-resist 50 (FIG. 6(c)); (4) performing development so as to remove a photo-resist 50a which is photosensitized (FIG. 6(d)); (5) forming the pressure sensing element 40, the connecting member 42, and the reinforcing part 46 in an integrated manner by etching a region on which the base substrate 48 is exposed until the base substrate 48 is penetrated (FIG. 6(e)); and (6) peeling off the photo-resist (FIG. 6(f)).

Figure 7:
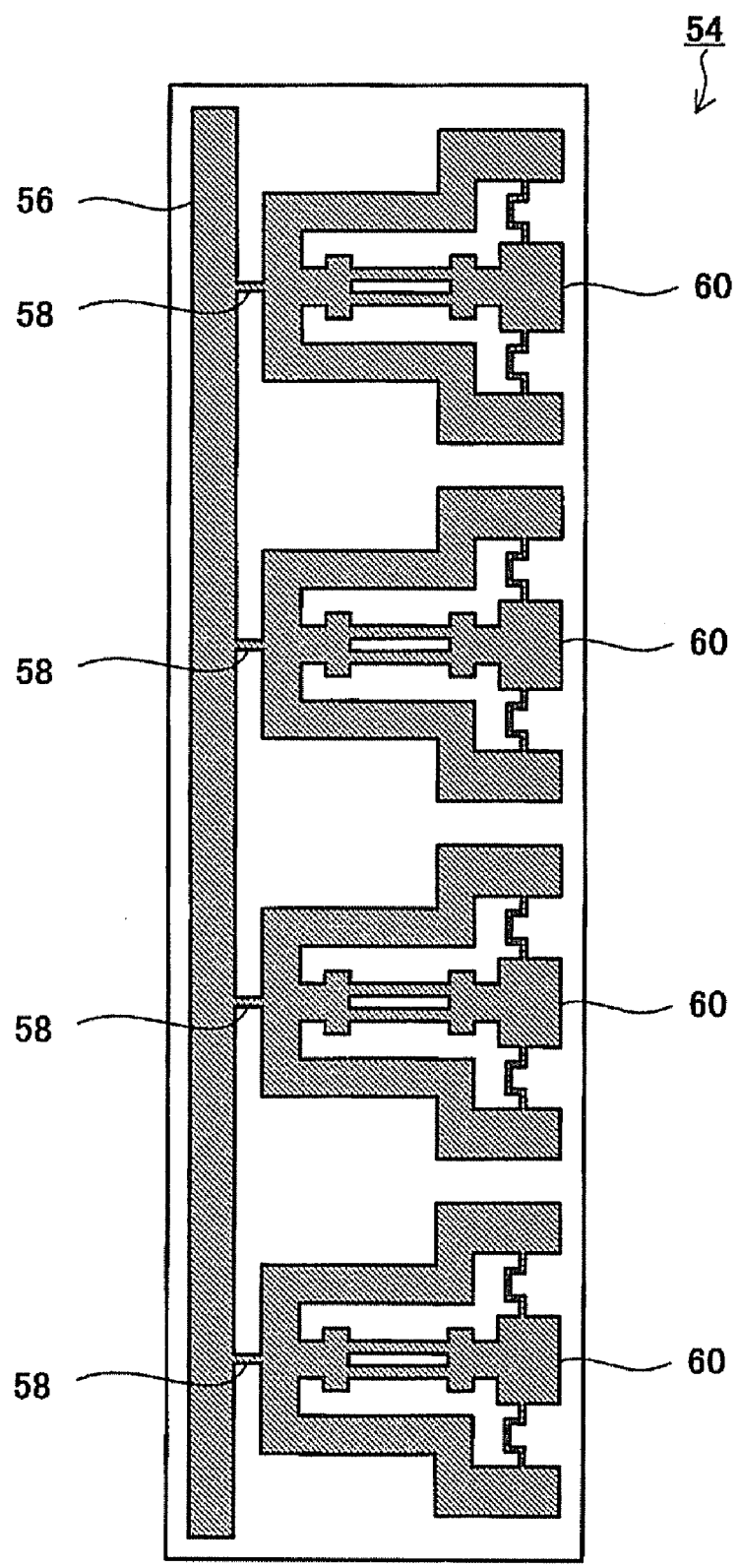
FIG. 7 is a diagram showing a patterning of a constituting piece according to the first aspect.

Further, a case of manufacturing a large number of pressure sensing elements 40, connecting members 42, and reinforcing parts 46 includes the following steps: arranging and forming frames 56 which are arranged in parallel, break-off portions 58 formed on the frames 56, a plurality of pressure sensing elements 40, connecting members 42, and reinforcing parts 46 on predetermined positions on a base substrate 54 as shown in FIG. 7; performing patterning corresponding to a plurality of pieces 60 connected to the break-off portions 58; and etching the base substrate 54 while leaving the patterning and breaking the break-off portions 58 so as to break off the pieces 60 from the frames 56.

In assembling of the pressure sensor 10, the hermetic terminals 38 are attached to predetermined positions of the diaphragm 24 which is fixed up to the hermetic terminal portion 16, the fixing part 26 is connected to a predetermined position of a surface of the central region 24a, which is a reverse surface of the pressure receiving surface of the diaphragm 24, and the fixing parts 28 are connected to predetermined positions of the marginal region 24c. Then the flange portion 14 and the hermetic terminal portions 38 are coupled to each other through the supporting shaft 18. Further, while using the piece 60 in which the pressure sensing element 40, the connecting member 42, and the reinforcing part 46 are integrated, the first base portion 40a of the pressure sensing element 40 is connected to the fixing part 26 which is fixed to the central region 24a, which faces the inside of the housing 12, of the diaphragm 24, the two upper end portions 42c of the connecting member 42 are connected to the fixing parts 28 which are fixed to the marginal region 24c, which faces the inside of the housing 12, of the diaphragm 24, and the end portions 38a of the hermetic terminals 38 are bonded with the extracted wirings of the connecting member 42 with the conductive adhesive. After the bonding, the reinforcing part 46 may be broken off. At the end, the pressure sensor 10 is structured by bonding the lateral surface portion 20 to the circumference 14b of the flange portion and the circumference 16a of the hermetic terminal portion 16 in a vacuum chamber; or by sucking air from a vacuum sealing hole 14d formed on the flange portion 14 or a vacuum sealing hole (not shown) formed on the lateral surface portion 20 and sealing after the lateral surface portion 20 is bonded to the circumference 14b and the circumference 16b.

In the pressure sensor 10 structured as above, the first base portion 40a positioned at one end of the pressure sensing element 40 in the detection axis direction is connected to the fixing part 26 (the central region 24a) which is displaced by pressure from the outside. While, the second base portion 40b positioned at the other end which is an opposite end to the first base portion 40a is connected to the fixing parts 28 (the marginal region 24c), which are not displaced by pressure from the outside, through the connecting member 42. Accordingly, the pressure sensor 10, in which the pressure sensing element 40 receives compressive stress due to pressure from the outside, measures absolute pressure. Further, the both ends of the pressure sensing element 40 are coupled to a diaphragm 24 side, being able to prevent an error in a pressure amount measurement value, which is accompanied by temperature change and caused by different linear expansion coefficients of the pressure sensing element 40 and the housing 12 made of different materials from each other.

The connecting member 42 serving as the connecting means includes a pair of supporting plates 42b which extends from the second base portion 40b in a manner to sandwich the vibrating arms 40c serving as the pressure sensing parts. Thereby, even though the pressure sensing element 40 receives stress from the diaphragm 24, the pressure sensing element 40 does not bend toward the connecting member 42 (in ±X direction), thus being able to prevent the pressure sensing element 40 from moving toward directions other than the detection direction. Accordingly, sensitivity in the detection direction of the pressure sensing element 40 can be improved, providing the pressure sensor 10 which is highly accurate.

Further, the first base portion 40a which is one end of the pressure sensing element 40 is coupled to the connecting member 42 through the reinforcing parts 46. Because of this, in a case where the pressure sensing element 40 and the connecting member 42 are formed in an integrated manner, the pressure sensing element 40 can be prevented from being broken off in mounting or the like. Accordingly, the process yield can be improved and cost reduction of the pressure sensor 10 can be achieved.

Figure 8:
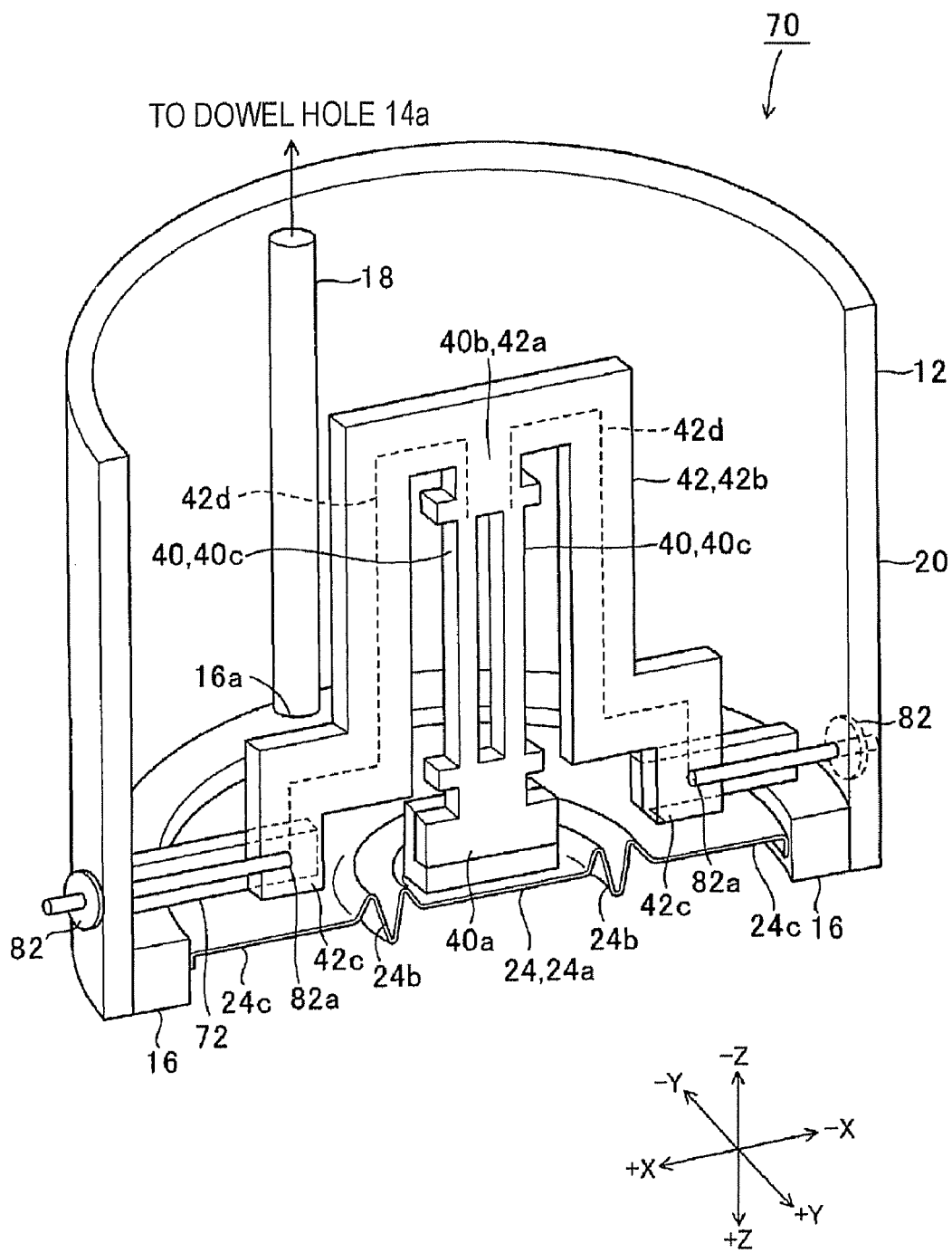
FIG. 8 is a perspective view showing a pressure sensor according to a second embodiment.
Figure 11A:
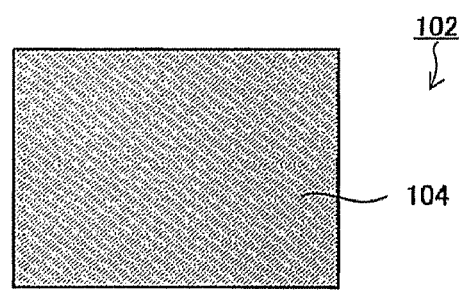
FIGS. 11(a)-11(f) are diagrams showing a process of photolithography-etching a pressure sensing element and the like according to the third embodiment.
Figure 11B:
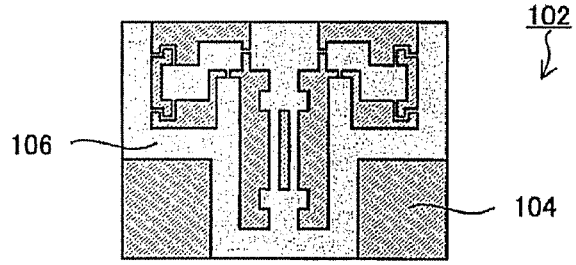
Figure 11C:
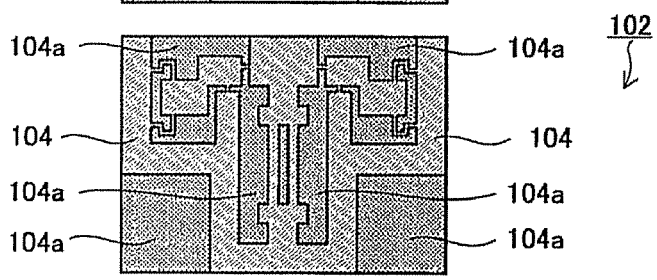
Figure 11D:
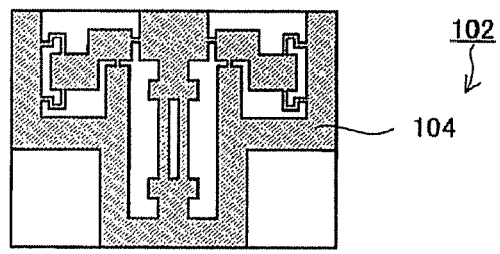
Figure 11E:
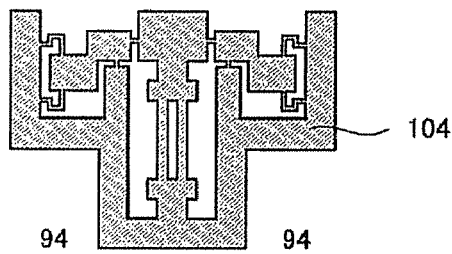
Figure 11F:
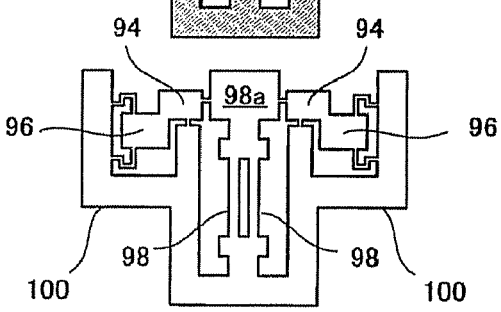

FIGS. 8 and 9 show a pressure sensor according to a second embodiment. FIG. 8 is a perspective view and FIG. 9 is a sectional view. It is common that a connecting member similar to the one in the first embodiment is coupled to a pressure sensing element in a pressure sensor 70 according to the second embodiment. However, the pressure sensor 70 of the second embodiment has such a structure that the connecting member is coupled to an inner wall (lateral surface portion 20) of the housing 12 opposed to the first base portion 40a, that is, the upper end portions 42c of the connecting member 42 having a U-shape are coupled to a diaphragm side of the housing 12. Here, the second embodiment includes the following three aspects which have similar effects.

First, as shown in FIGS. 8 and 9(a), such a structure is cited that a pair of fixing parts 72 is attached to the inner wall of the housing 12, that is, to predetermined positions, at the diaphragm side, of the inner wall of the lateral surface portion 20; the upper end portions 42c of the connecting member 42 are coupled to the fixing parts 72; a second connecting member 74, instead of the fixing part 26 used in the first embodiment, is connected to the central region 24a of the diaphragm 24 at a reverse surface of the pressure receiving surface of the diaphragm 24; and the first base portion 40a of the pressure sensing element 40 is coupled to the second connecting member 74 with adhesive or the like so as to be coupled to the central region 24a with the second connecting member 74 interposed therebetween. Next, as shown in FIG. 9(b), such a structure is cited that a first base portion 76a of a pressure sensing element 76 is extended in a longitudinal direction (±Z direction in a detection axis direction) so as to be coupled to the central region 24a; or supporting plates 78b of a connecting member 78 are formed shorter than the size of the pressure sensing element 76 in the longitudinal direction so as to couple upper end portions 78c to the fixing parts 72 attached to the inner wall of the lateral surface portion 20, and the first base portion 76a is coupled to the central region 24a with the fixing part 26 interposed therebetween likewise the first embodiment. Further, as shown in FIG. 9(c), such a structure is cited that a central region 80a of a diaphragm 80 is formed to have a concave shape concaved toward the inside of the housing 12 and a lower surface of a bottom of the concave shape and the first base portion 40a of the pressure sensing element 40 are coupled to each other with the fixing part 26 interposed therebetween likewise the first embodiment.

In each of the aspects, hermetic terminals 82 are provided such that end portions 82a are inserted from an outer wall of the lateral surface portion 20 and the end portions 82a are attached to extracted wirings 78d which are extended to the upper end portions. The end portions 82a and the extracted wirings 78d are bonded to each other with the conductive adhesive 44 so as to be electrically connected to each other. Accordingly, the pressure sensing elements 40 and 76 can be electrically connected to an oscillation circuit (not shown) provided outside the housing 12 through the extracted wirings 42d and 78d respectively and the hermetic terminals 82. Here, as shown in FIG. 8, positioning of the dowel hole 14a on the flange portion 14 and positioning of the dowel hole 16a on the hermetic terminal portion 16 are performed, that is, positioning of the supporting shaft 18 is performed so as to avoid interference between the supporting shaft 18 and the hermetic terminals 82.

In assembling of the pressure sensor 70, the fixing parts 72 are connected to predetermined positions of the inner side of the lateral surface portion 20, the supporting shaft is connected to the dowel hole 14a of the flange portion 14, and a circumference 14b of a thick region of the flange portion and the lateral surface portion 20 are bonded to each other with adhesive or the like. Then the upper end portions 42c and 78c of the connecting members 42 and 78 are connected to the fixing parts 72 with adhesive or the like. In the case of FIG. 9(a), the second connecting member 74 is connected to the central region 24a of the diaphragm 24 with adhesive or the like; adhesive is applied to a predetermined position of the first base portion 40a of the pressure sensing element 40, that is, a surface which contacts with the second connecting member 74; and the hermetic terminal portion 14 is set to be connected with the supporting shaft 18, connecting the first base portion 40a and the second connecting member 74 with each other. In the case of FIG. 9(b), the fixing part 26 is connected to a predetermined position of the central region 24a of the diaphragm 24 with adhesive or the like; adhesive is applied to a surface, which contacts with the fixing part 26, of the first base portion 76a of the pressure sensing element 76; and the hermetic terminal portion 14 is set to be connected with the supporting shaft 18, connecting the first base portion 76a and the fixing part 26 with each other. In the case of FIG. 9(c), the fixing part 26 is connected to a predetermined position of the central region 80a of the diaphragm 80 with adhesive or the like; adhesive is applied to a surface, which contacts with the fixing part 26, of first base portion 40a of the pressure sensing element 40; and the hermetic terminal portion 14 is set to be connected with the supporting shaft 18, connecting the first base portion 40a and the fixing part 26 with each other. Here, since a process of the vacuum sealing is same as that of the first embodiment, a description thereof is omitted.

When the second connecting member 74 is made of the same material as that of the pressure sensing element 40 in FIG. 9(a), the structure of FIG. 9(a) is almost same as that of FIG. 9(b). In FIG. 9(a), in a case where the second connecting member 74 is made of a different material from materials of the supporting shaft 18 and the hermetic terminal portion 16, it would appear that, because of difference between their linear expansion coefficients, amounts of expansion/constriction accompanied by temperature change differ between: the second connecting member 74, that is, a part corresponding to a gap between the central region 24a and the first base portion 40a in ±Z direction; and a region 75 which is formed by the supporting shaft 18 and the hermetic terminal portion 16 with a thickness same as the size of the gap and disposed at a position same as that of the gap in ±Z direction, whereby an error appears in a pressure measurement value. However, the thickness of the second connecting member 74 can be reduced by design change. Accordingly, stress change accompanied by temperature change and caused by different kinds of materials having different linear expansion coefficients from each other hardly occurs. The stress is applied on the pressure sensing element in the detection axis direction. Further, in a case where the second connecting member 74 is made of the same material as materials of the supporting shaft 18 and the hermetic terminal portion 16, there is no difference between the amounts of expansion/constriction. In the structure of FIG. 9(c), it would be appear that amounts of expansion/constriction accompanied by temperature change differ between a concave portion 81 and the region 75 in proportion to depth of the concave portion 81 formed in the central region 80a of the diaphragm 80, and an error in the pressure measurement value becomes more serious. However, likewise the above case, stress change accompanied by temperature change in a use of disparate materials having different linear expansion coefficients from each other hardly occurs by reducing the depth of the concave portion 81. The stress is applied to the pressure sensing element in the detection axis direction. The upper end portions 42c and 78c have certain rigidity and are fixed to the fixing parts 28 which are attached to the lateral surface portion 20, so that certain rigidity is obtained between the housing 12 and the pressure sensing elements 40 and 76 and the connecting members 42 and 78, being able to securely capture displacement in the detection axis direction.

According to the second embodiment, the first base portions 40a and 76a which are one ends of the pressure sensing elements 40 and 76 respectively in the detection axis direction are coupled to the central regions 24a and 80a, which are displaced by pressure from the outside, of the diaphragms 24 and 80. The second base portions 40b and 82b positioned at the other ends, which are opposite ends to the one ends, are coupled to the diaphragm side of the housing 12 which is not displaced by pressure from the outside, respectively through the connecting members 42 and 78. Accordingly, the pressure sensor 70, in which the pressure sensing elements 40 and 76 receive compressive stress in response to pressure from the outside, measures absolute pressure. Further, since the pressure sensing elements 40 and 76 are coupled to the diaphragm side of the housing 12, a problem caused by mismatch between the linear expansion coefficients described above hardly occurs or does not occur. In addition, the pressure sensing elements 40 and 76 are fixed to the housing 12 (the lateral surface portion 20) which has high rigidity, obtaining rigidity between the pressure sensing elements 40 and 76 and the housing 12. Accordingly, the pressure sensor 70 which secures force transmission from the diaphragms 24 and 80 to the pressure sensing elements 40 and 86 and thus has stable sensitivity can be obtained.

FIG. 10 shows a pressure sensor according to a third embodiment. Fundamental structure of a pressure sensor 90 according to the third embodiment is same as that of the first embodiment (the second embodiment). However, the pressure sensor 90 has a reaction force generating part 94 which is coupled to a diaphragm 92 and applies force in an opposite direction to gravity force, which is applied to the diaphragm 92, to the diaphragm 92 by using a weight 96 under the principle of leverage. FIG. 10 shows the sensor obtained by applying the third embodiment to the first embodiment. As shown in FIG. 10, the weight 96 is disposed at a point of force 94b of the reaction force generating part 94, a point of action 94c is connected to a first end portion 98a of a pressure sensing element 98 (or a central region 92a of the diaphragm 92), and a fulcrum 94a is set to be a protrusion 100a formed on a connecting member 100 as the protrusion 100a, supporting the reaction force generating part 94. Thus a seesaw mechanism is structured. In this case, it can be considered that the reaction force generating part 94 and the weight 96 substitute for a part of the reinforcing part 46 in the first embodiment, and the rest of the reinforcing part 46a couples the weight 96 and the connecting member 100.

As is the case with the first embodiment, the reaction force generating part 94 and the weight 96 can be formed in a manner to be integrated with the pressure sensing element 98, the connecting member 100, and the reinforcing part 46a.

FIG. 11 is a process diagram showing photolithography-etching in the third embodiment. A case of forming the pressure sensing element 98, the connecting member 100, the reinforcing part 46a, the reaction force generating part 94, and the weight 96 in an integrated manner by photolithography-etching has the following process including steps (1) to (6): (1) preparing a base substrate 102 to be a material and applying a positive type photo-resist 104 on a surface of the base substrate 102 (FIG. 11(a)); (2) exposing to light by using a photo-mask 106 corresponding to an arrangement and shapes of the pressure sensing element 98, the connecting member 100, the reinforcing part 46a, the reaction force generating part 94, and the weight 96 (FIG. 11(b)); (3) photosensitizing the photo-resist 104 (FIG. 11(c)); (4) performing development so as to remove a photo-resist 104a which is photosensitized (FIG. 11(d)); (5) forming the pressure sensing element 98, the connecting member 100, the reinforcing part 46a, the reaction force generating part 94, and the weight 98 in an integrated manner by etching a region on which the base substrate 102 is exposed until the base substrate 102 is penetrated (FIG. 11(e)); and (6) peeling off the photo-resist 104 (FIG. 11(f)). Further, in a case of forming these in large amounts, a photo-resist corresponding to a piece (not shown) in which the pressure sensing element 98, the connecting member 100, the reinforcing part 46a, the reaction force generating part 94, and the weight 96 are integrated in a predetermined arrangement is patterned on a base substrate (not shown) and the piece is divided into pieces by the same method as that of the first embodiment (refer to FIG. 7).

In a case where an outer surface (pressure receiving surface) of the diaphragm 92 is in an upward direction, a flexible region 92b of the diaphragm 92 bends and deforms by gravity force which is applied to the diaphragm 92 and therefore a central region 92a is displaced toward the inside of the housing 12 so as to apply compressive stress to the pressure sensing element 98. While, in a case where the outer surface of the diaphragm 92 is in a downward direction, the central region 92a is displaced toward the outside of the housing 12 so as to apply extensional stress to the pressure sensing element 98.

On the other hand, the reaction force generating part 94 can invert force, which is applied to the weight 96 due to gravity force, through the fulcrum 94a so as to transmit the inverted force to the diaphragm 92. In this case, the weight 96 is designed to have largeness (weight) by which inertia moment which is given to the fulcrum 94a by the weight 96 agrees with inertia moment which is given to the fulcrum 94a by the diaphragm 92 and thus the reaction force generating part 94 in the seesaw mechanism balances at the fulcrum 94a. Accordingly, the stress of bend and deformation caused by gravity force which is applied to the diaphragm 92 is cancelled by the weight 96. Thereby, the pressure sensing element 98 does not receive the stress of bend and deformation caused by the gravity force which is applied to the diaphragm 92, providing a highly accurate pressure sensor 90 which reduces an error in a pressure measurement value which is caused by change in application of gravity acceleration.

Further, on a surface of the weight 96, a metal film 108 made of Au or the like can be disposed. Thus the metal film 108 is disposed after formation of the weight 96, so that chances for adjusting a weight of a weight 96 side are increased. In addition, the weight of the weight 96 side is fine adjusted by disposing the metal film 108 of an appropriate amount, thus being able to easily adjust the balance between the weight 96 and the diaphragm 92. Further, the metal film 108 can be peeled off after the metal film 108 is disposed, so that chances for adjusting the weight of the weight 96 side are further increased. In addition, the metal film 108 can be peeled off by a leaser beam or the like, so that the weight of the weight 96 side can be adjusted even after the manufacturing of the pressure sensor 90 in a case where the housing 12 or the diaphragm 92 is made of a material through which a leaser beam can passes, improving yield of the pressure sensor 90. Here, since the third embodiment does not constitutionally interfere with the first embodiment and the second embodiment, the third embodiment is applicable to the first embodiment and the second embodiment.

FIG. 12 shows a pressure sensor 110 according to a fourth embodiment. The pressure sensor 110 according to the fourth embodiment includes the same components inside a housing 112 as those of the first embodiment to the third embodiment. However, in the pressure sensor 110, the housing 112 is integrally molded by metal squeezing.

Figure 12A:
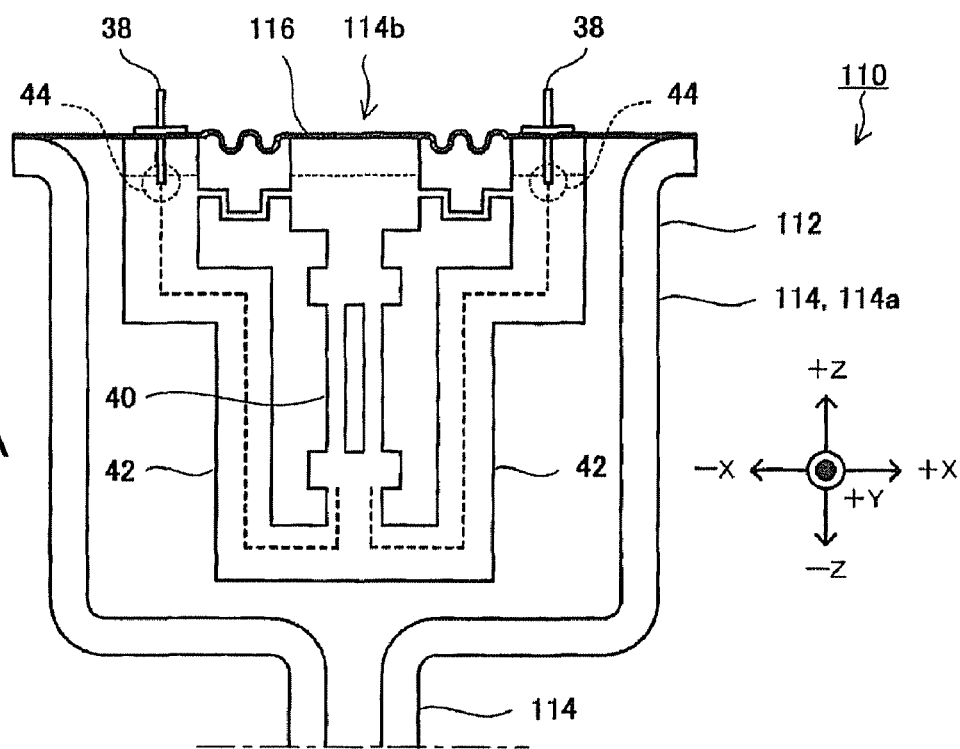
FIGS. 12(a) and 12(b) are sectional views showing a pressure sensor according to a fourth embodiment.
Figure 12B:
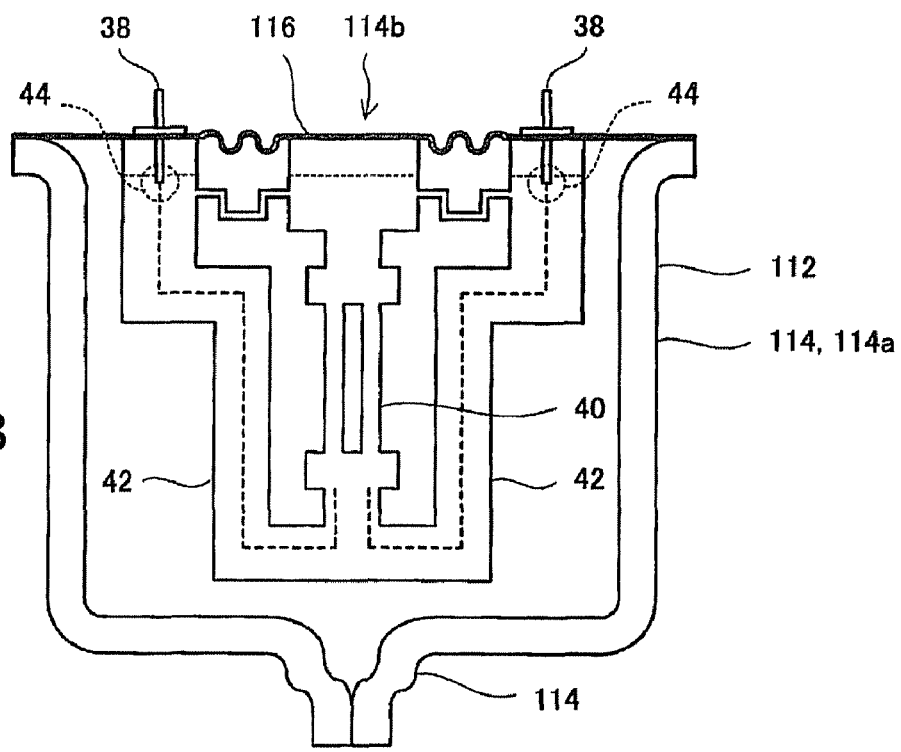

As a material of the housing 112, as shown in FIG. 12(a), a pipe 114 of which an inner diameter and an outer shape are enlarged at an end region 114a is used. An opening 114b at the end region 114a is closed by a diaphragm 116 provided with the components described above, and vacuuming is performed from the opposite side of the end region 114a of the pipe 114. Then, as shown in FIG. 12(b), the pipe 114 is crashed by sheet-metal processing so as to close a pathway of the pipe 114, whereby the end region 114a becomes the housing 112. The fourth embodiment is applicable to the first embodiment to the third embodiment. In this case, the fixing parts 72 in the second embodiment are attached to an inner wall, at an opening side, of the end region 114a. In the first embodiment to the third embodiment, the housing 12 does not have any contact points with the components described above except for at the marginal region 24c of the diaphragm 24 (80) and at the lateral surface (the lateral surface portion 20) of the housing 12 at the diaphragm 24 (80) side. Therefore, the housing 112 can be formed integrally as illustrated in the fourth embodiment and thus the structure and the manufacturing process are simplified, whereby the cost reduction can be achieved.

Figure 13:
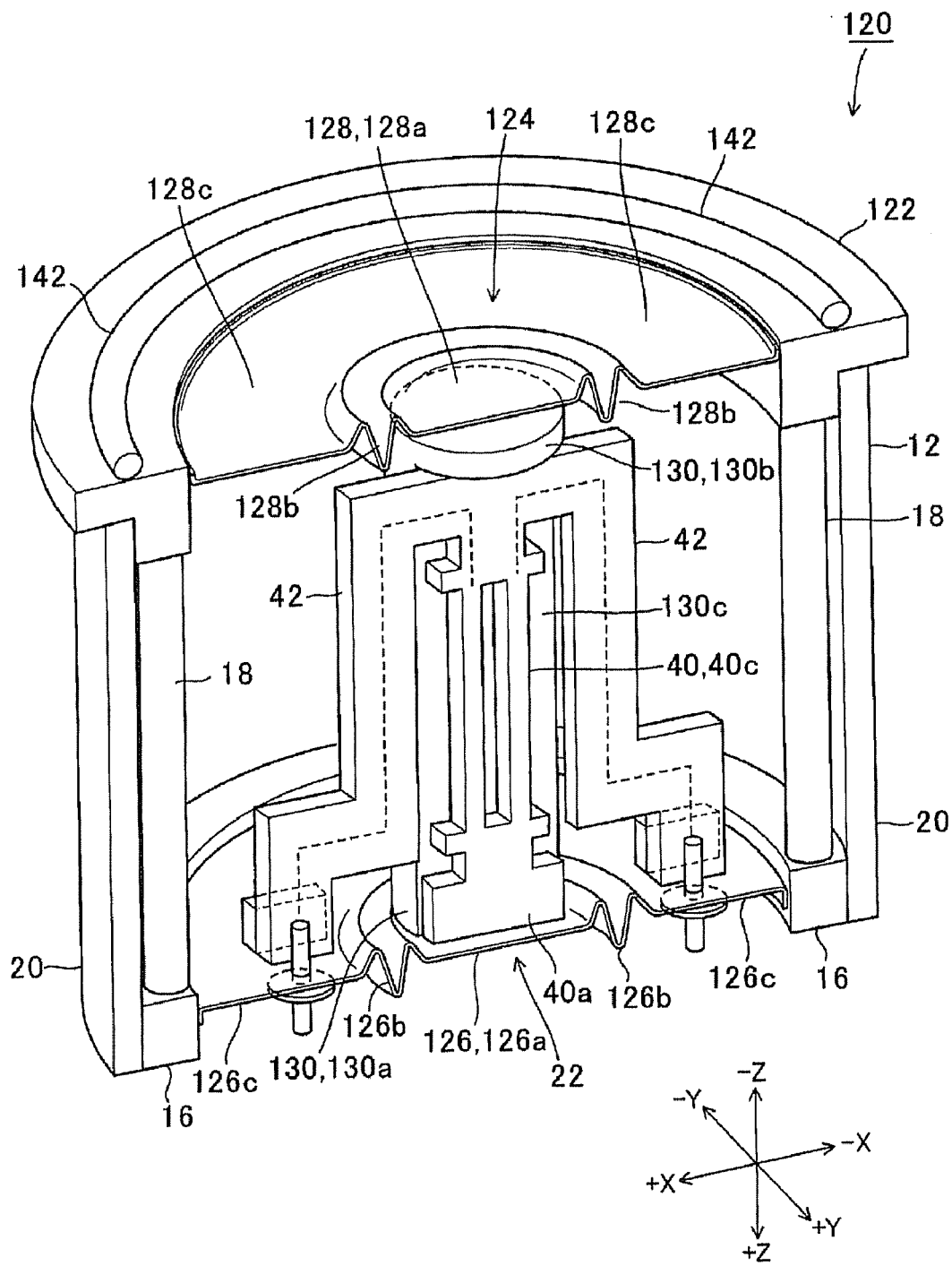
FIG. 13 is a perspective view showing a pressure sensor according to a fifth embodiment.
Figure 14A:
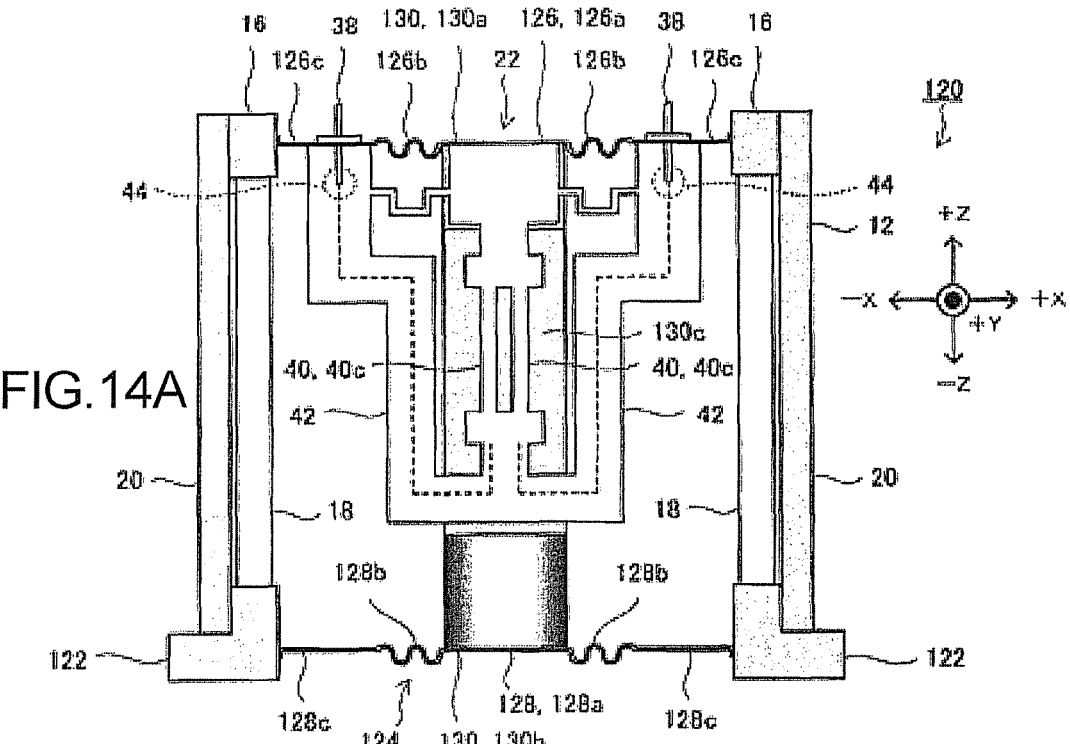
FIGS. 14(a) and 14(b) are sectional views showing the pressure sensor according to the fifth embodiment.
Figure 14B:
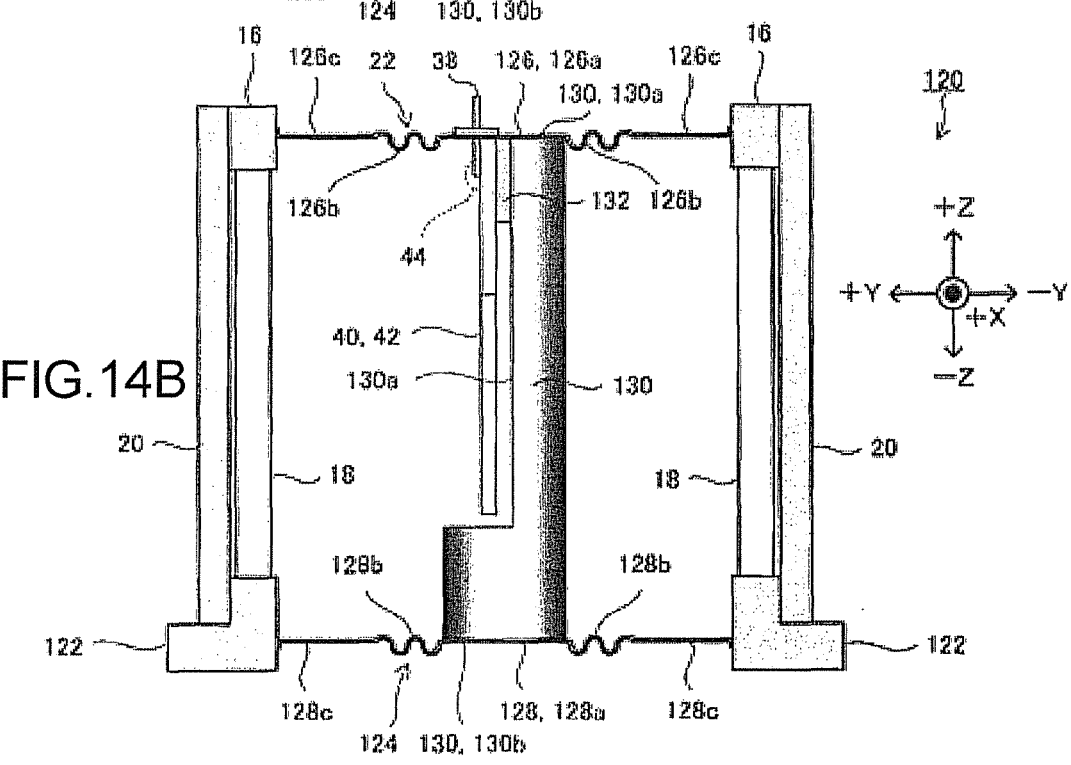

FIG. 13 (perspective view) and FIG. 14 (FIG. 14(a) and FIG. 14(b) are both sectional views) show a pressure sensor 120 according to a fifth embodiment. The pressure sensor 120 according to the fifth embodiment includes the same components (pressure sensing element, connecting member) inside the housing as those of the first embodiment to the third embodiment. However, the pressure sensor of the fifth embodiment can measure relative pressure, while the pressure sensors of the first embodiment to the third embodiment measure absolute pressure. Here, an application of the present embodiment to the first embodiment will be described, but the present embodiment is applicable to the second embodiment and the third embodiment as well.

To the opening 22 of the hermetic terminal portion 16 constituting the housing 12, a first diaphragm 126 serving as a pressure receiving means is attached. A flange portion 122 has a second opening 124 formed opposed to the opening 22 of the hermetic terminal portion 16 and closed by a second diaphragm 128 serving as a second pressure receiving means. The first diaphragm 126 and the second diaphragm 128 are coupled with each other through a force transmission shaft 130. The first diaphragm 126 includes a central region 126a, a flexible region 126b, and a marginal region 126c. The central region 126a is displaced by pressure from the outside. The flexible region 126b is positioned at the circumference of the central region 126a and bends and deforms by the pressure from the outside. The marginal region 126c is positioned at the periphery of the flexible region 126b and bonded with the opening 22 of the hermetic terminal portion 16. In the same manner, the second diaphragm 128 includes a central region 128a, a flexible region 128b, and a marginal region 128c. The central region 128a is displaced by pressure from the outside. The flexible region 128b is positioned at the circumference of the central region 128a and bends and deforms by the pressure from the outside. The marginal region 128c is positioned at the circumference of the flexible region 128b and bonded with the second opening 124 of the flange portion 122.

The force transmission shaft 130 is disposed inside the housing 12, one end 130a in the longitudinal direction is connected to the central region 126a of the first diaphragm 126, and the other end 130b which is an opposite end to the one end 130a is connected to the central region 128a of the second diaphragm 128. The force transmission shaft 130 has a cylindrical column shape, but has a counter boring 130c formed at a position on which the force transmission shaft 130 contacts with the connecting member 42 and the like, so as to avoid interference of the force transmission shaft 130 with the pressure sensing element 40, the connecting member 42, and the like. Therefore, the force transmission shaft 130 has a section which is a cylindrical column shape at a second diaphragm 128 side, and a section which is a hemicycle shape at a first diaphragm 126 side. Here, the fixing part 26 used in the first embodiment need not be connected to the first diaphragm 126, but the first base portion 40a of the pressure sensing element 40 is coupled to the counter boring 130c and brought into contact with the central region 126a. On this occasion, the first base portion 40a of the pressure sensing element 40 is coupled to the counter boring 130c with a spacer 132 interposed therebetween so as to avoid interference of the vibration arms 40c of the pressure sensing element 40 with the counter boring 130c.

Figure 15A:
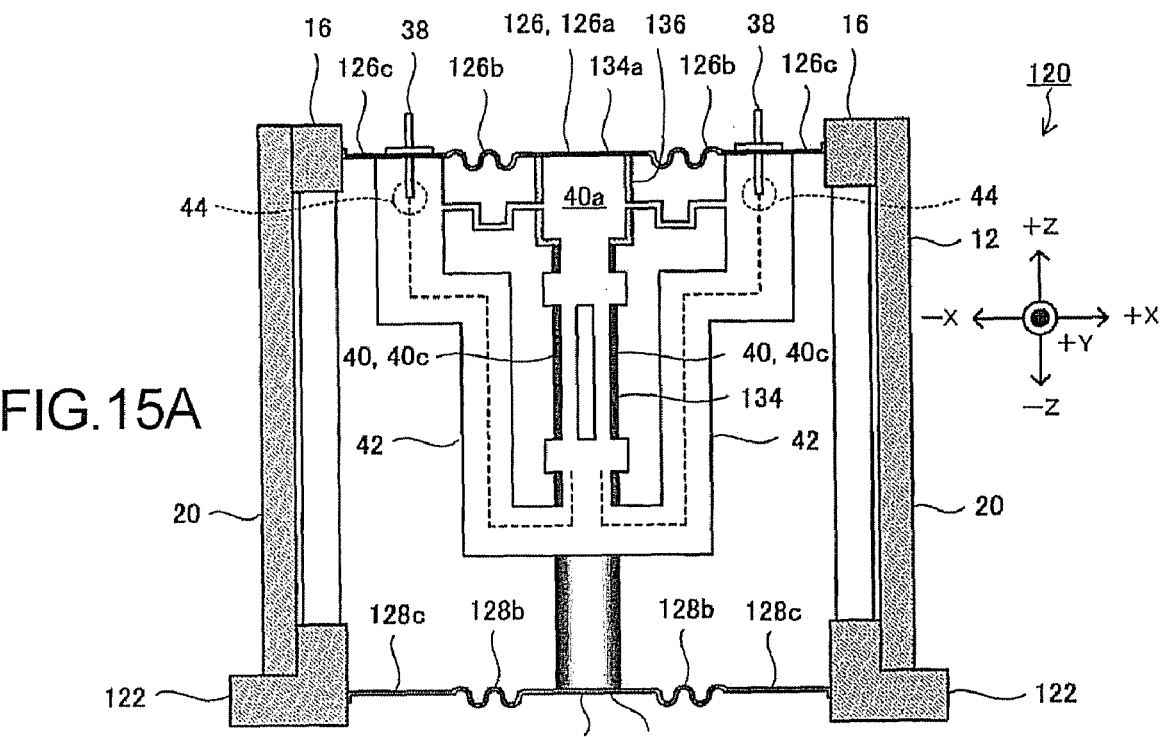
FIGS. 15(a) and 15(b) are diagrams showing a modification of the pressure sensor according to the fifth embodiment.
Figure 15B:
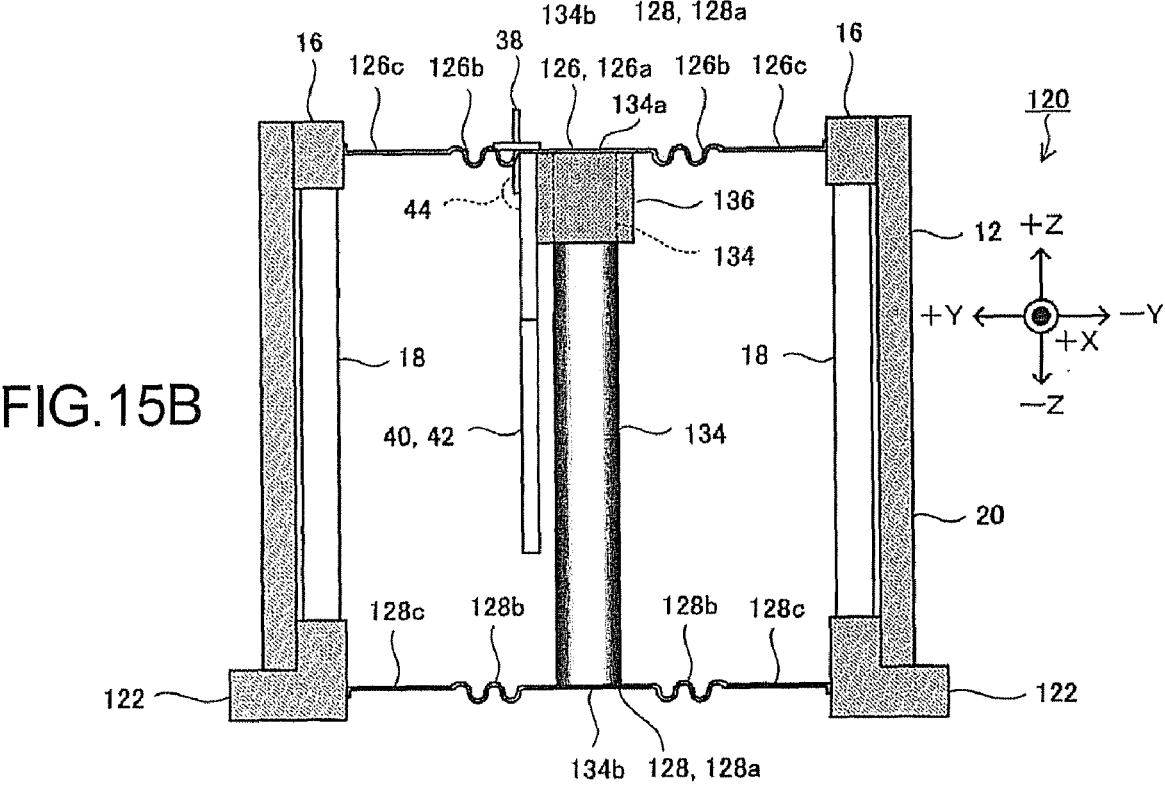

Further, as shown in FIG. 15 (FIG. 15(a) and FIG. 15(b) are both sectional views), the pressure sensor 120 may be structured to have a force transmission shaft 134 which is coupled to the first diaphragm 126 and the second diaphragm 128 and is thinner than the force transmission shaft 130, and a force transmission part 136 which is coupled to the force transmission shaft 134 in a manner to be penetrated by the force transmission shaft 134 and fixes the first base portion 40a of the pressure sensing element 40. In this case, one end 134a of the force transmission shaft 134 is coupled to the central region 126a of the first diaphragm 126 and the other end 134a which is an opposite end to the one end 134a is coupled to the central region 128a of the second diaphragm 128. There is no need to form a counter boring on the force transmission shaft 134, simplifying the manufacturing.

Figure 16:
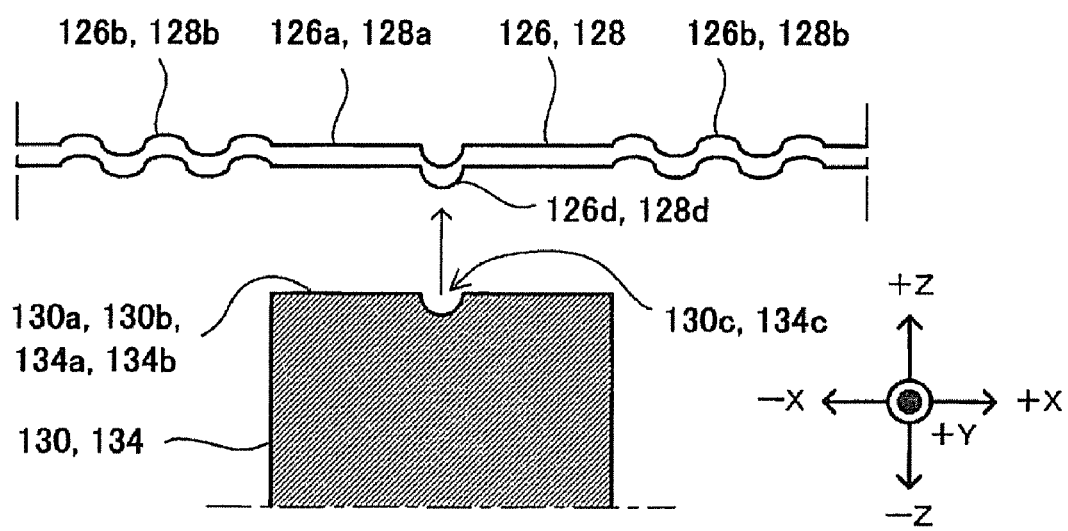
FIG. 16 is a schematic view showing a process of pressing a diaphragm according to the fifth embodiment.

In a case where the first diaphragm 126 and the second diaphragm 128 are made of metal, a metal base member (not shown) is pressed from its both surfaces by a pair of pressing plates (not shown) having a ribbed portions which correspond to concentric circular shapes as is the case with the first embodiment. FIG. 16 is a schematic view showing the first diaphragm and the second diaphragm made of metal. With the pair of pressing plates in which one pressing plate (not shown) has a convex portion (not shown) formed on a center thereof and the other pressing plate (not shown) has a concave portion (not shown) formed on a center thereof, convex portions 126d and 128d are formed at centers of respective diaphragms. The convex portions 126d and 128d are set in concave portions 130c and 134c formed at the both ends of the force transmission shafts 130 and 134. In this case, if the convex portions 126d and 128d are bonded and fixed to the concave portions 130c and 134c by using a bonding means (bonder) such as low-melting glass and organic adhesive the following problem can be prevented. The problem is that when the first diaphragm 126 and the second diaphragm 128 are operated with the force transmission shafts 130 and 134, pressure detecting accuracy is degraded by leak of force, which is to be transmitted, caused by declination at connecting parts between the convex portions 126d and 128d and the concave portions 130c and 134c.

Figure 17A:
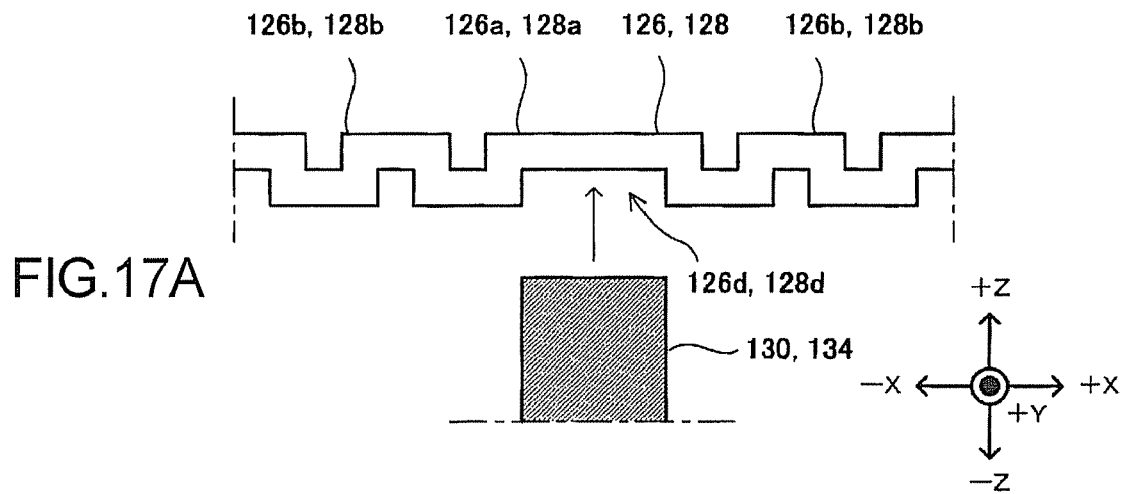
FIGS. 17(a)-17(c) are schematic views showing a process of pressing a diaphragm according to the fifth embodiment.
Figure 17B:
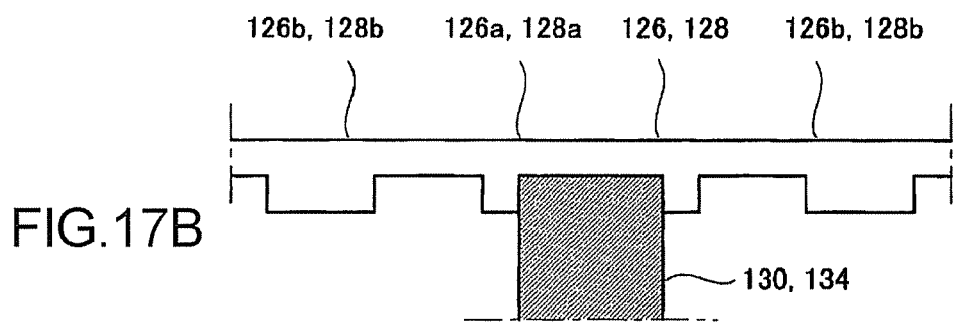
Figure 17C:
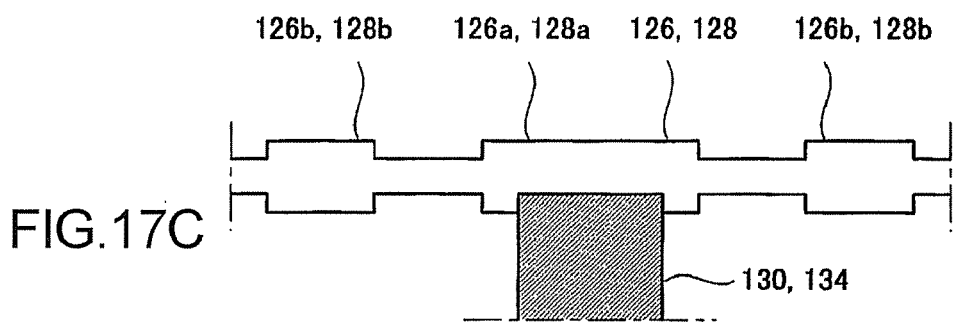

Further, in a case where the first diaphragm 126 and the second diaphragm 128 are made of quartz crystal, they are formed by photolithography-etching as is the case with the first embodiment. FIG. 17(a) is a schematic view showing a first diaphragm and a second diaphragm made of quartz crystal. A manufacturing process of the first diaphragm 126 and the second diaphragm 128 is same as the manufacturing process of the diaphragm 24 shown in FIG. 4. However, the first diaphragm 126 and the second diaphragm 128 include concave portions 126d and 128d, into which the force transmission shafts 130 and 134 are set, respectively in the central regions 126a and 128a. The photo-resist 34 is exposed to light by using a photo-mask (not shown) corresponding to the concave portion in the step (2) shown in FIG. 4(b) and the photo-resist 34a which is photosensitized is removed in the step (3) shown in FIG. 4(c), being able to form the first diaphragm 126 and the second diaphragm 128. Further, the first diaphragm 126 and the second diaphragm 128 can be formed to have shapes, corresponding to shapes of the diaphragm 24 shown in FIG. 5(a) and FIG. 5(b), as shown in FIG. 17(b) and FIG. 17(c).

The force transmission shaft 130 (134) needs to have certain rigidity so as to securely transmit force between the one end 130a (134a) and the other end 130b (134b). Further, the force transmission shaft 130 (134) is preferably made of the same material as that of the supporting shaft 18 constituting the housing 12. Accordingly, a difference between amounts of expansion and constriction, in the detection axis direction of the pressure sensing element 40, of the force transmission shaft 130 (134) and the supporting shaft 18 is not generated. The difference between the amounts of expansion and constriction is accompanied by temperature change and different linear expansion coefficients of the force transmission shaft 130 (134) and the supporting shaft 18. Therefore, force from the force transmission shaft 130 (134) which is applied to the first diaphragm 126 and the second diaphragm 128 is maintained constant regardless of the temperature change. Thus, sensitivity of the pressure sensor 120 can be prevented from varying depending on the temperature change.

With such structure, when pressure at the first diaphragm 126 side is high, the force transmission shafts 130 and 134 act to push the central region 128a of the second diaphragm 128 toward the outside of the housing 12 and the pressure sensing element 40 receives compressive stress. On the other hand, when pressure at the second diaphragm 128 side is high, the force transmission shafts 130 and 134 act to push the central region 126a of the first diaphragm 126 toward the outside of the housing 12 and the pressure sensing element 40 receives extensional stress. Accordingly, the pressure sensors 10, 70, and 80 according to the first embodiment to the third embodiment can be formed as the pressure sensor 120 which can measure relative pressure.

Figure 18:
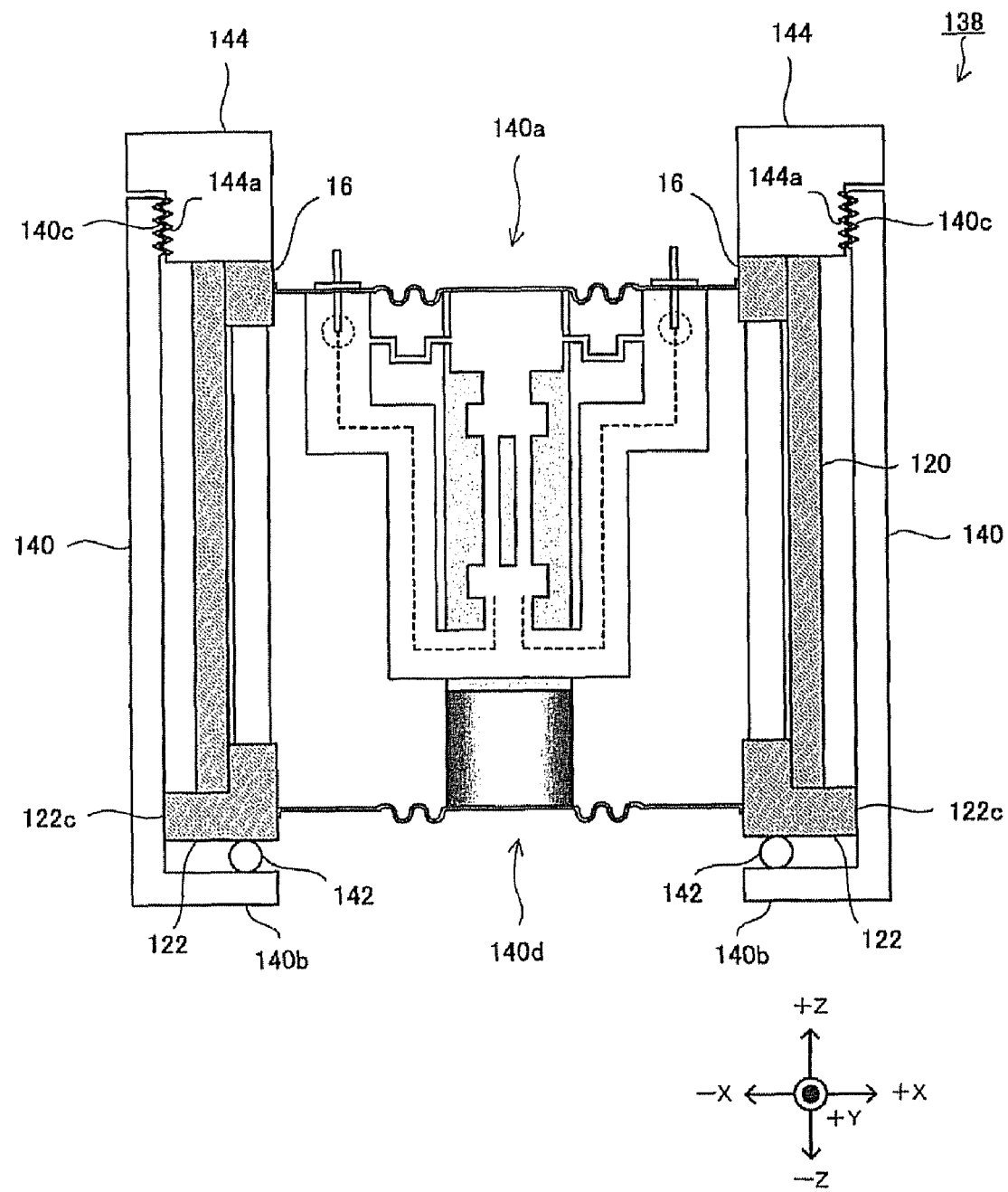
FIG. 18 is a schematic view showing the pressure sensor being mounted according to the fifth embodiment.

Further, in the fifth embodiment, the pressure sensor is preferably mounted on a pressure sensor case 138 shown in FIG. 18. The case 138 having a cylindrical shape includes a first member 140, an O ring 142 (refer to FIG. 13), and a second member 144. In the first member 140, one end thereof has an introduction opening 140a which has an approximately the same size as a circumference 122c in a thin region of the flange portion 122 and introduces from a flange portion 122 side of the housing 12, and the other end has a stopper 140b which stops the flange portion 122 and forms an opening 140d having a ring shape. The O ring 142 is disposed in a concentric fashion with the stopper 140b and is sandwiched between the stopper 140b and the flange portion 122. The second member 144 has a male screw portion 144a engaging with a female screw portion 140c which is formed at the opening 140a of the first member 140, and presses the flange portion 14 on the O ring 142 while engaging the male screw portion 144a with the female screw portion 140c so as to spatially separate the introduction opening 140a and the opening 140d by the O ring 142. Accordingly, the pressure sensor 120 can be mounted only by screwing the second member 144 into the first member 140, and spatial-blocking between a measured environment side at the flange portion 122 side and a measurement environment side at the hermetic terminal portion 16 side can be easily and securely performed.

Figure 19:
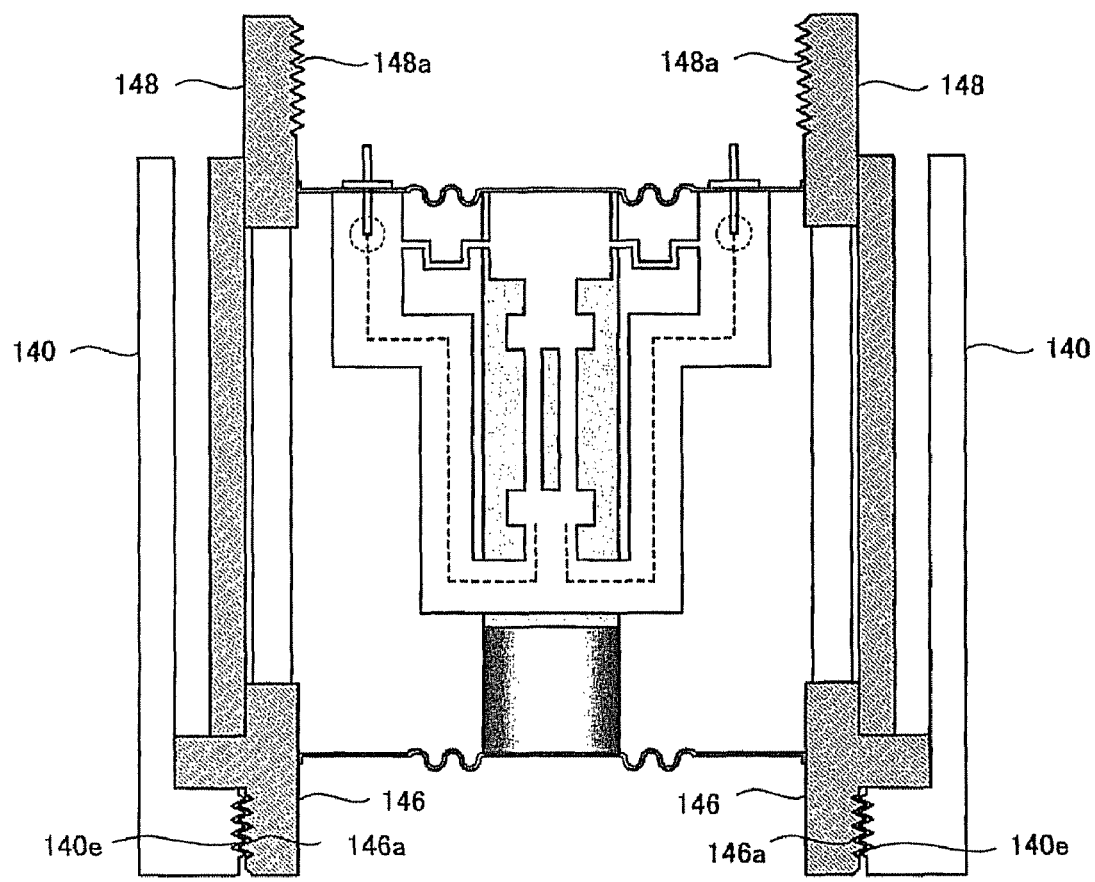
FIG. 19 shows a mounting modification of the pressure sensor according to the fifth embodiment.

Alternatively, as shown in FIG. 19, spatial-blocking between a measured environment side at a flange portion 146 side and a measurement environment side at a hermetic terminal portion 148 side may be performed by engaging a male screw portion 146a formed on a flange portion 146 with a female screw portion 140e formed on the first member 140. In the engaging, a seal tape is preferably wound around the male screw portion 146a so as to prevent leak of air, liquid, or the like between the male screw portion 146a and the female screw portion 140e. Similarly, a female screw portion 148a may be formed on the hermetic terminal portion 148 and a connector (not shown) having a male screw which engages with the female screw portion 148a may be coupled.

In a case where the fifth embodiment is applied to the third embodiment, the weight of the weight 96 needs to be adjusted so as to allow the inertia moment which is given to the fulcrum 94a by the weight 96 to agree with inertia moment which is given to the fulcrum 94a by total force of stress according to bend-deformation of the first diaphragm 126 and the second diaphragm 128 due to gravity force and load due to gravity force which is applied to the force transmission shafts 130 and 134.

Figure 20:
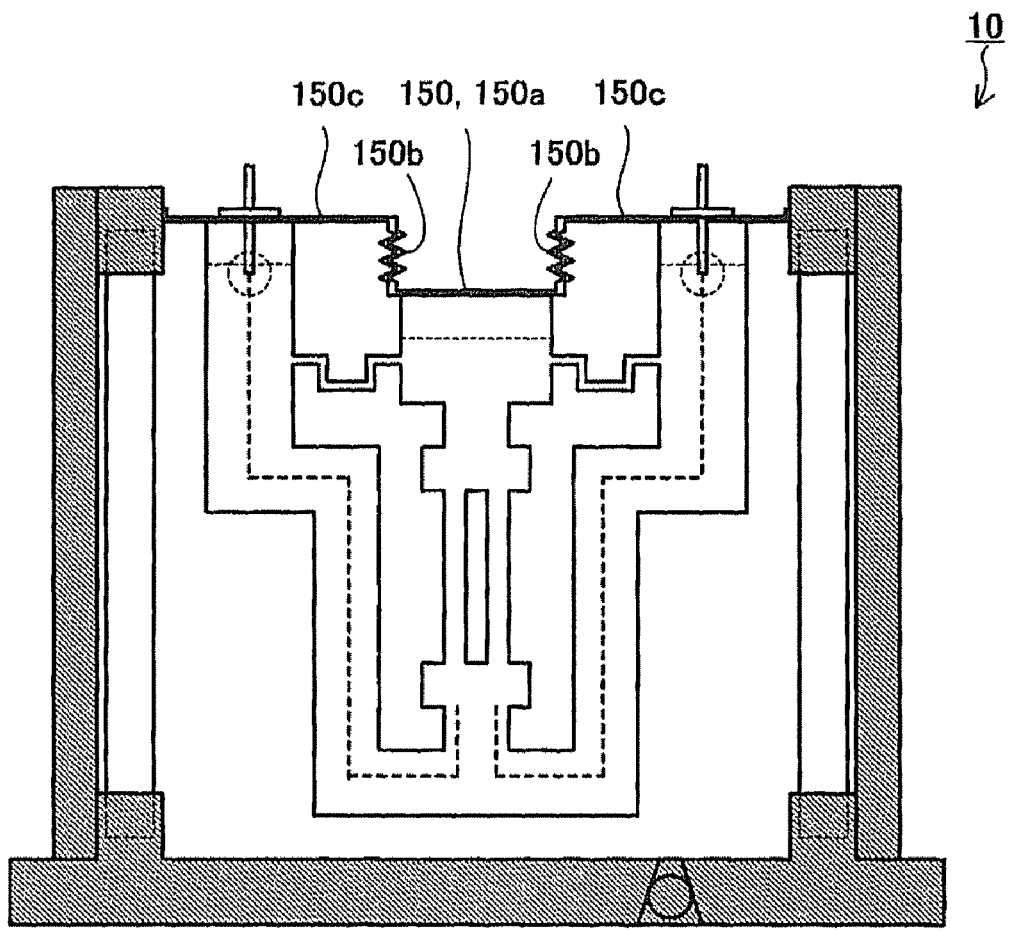
FIG. 20 shows a modification of a pressure receiving means.
Figure 21:
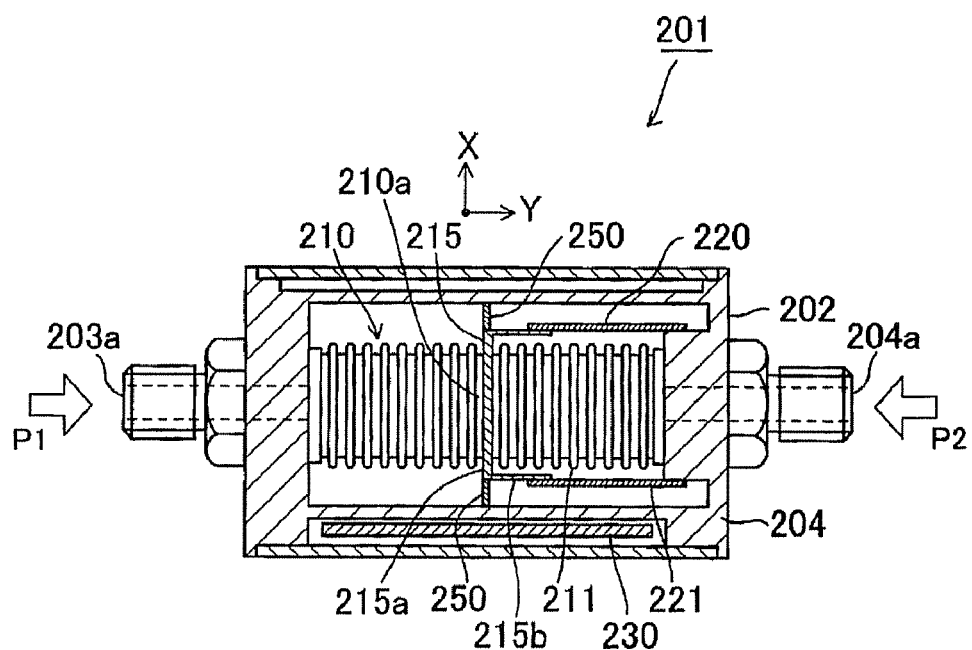
FIG. 21 is a schematic view showing a pressure sensor according to a first related art.
Figure 22:
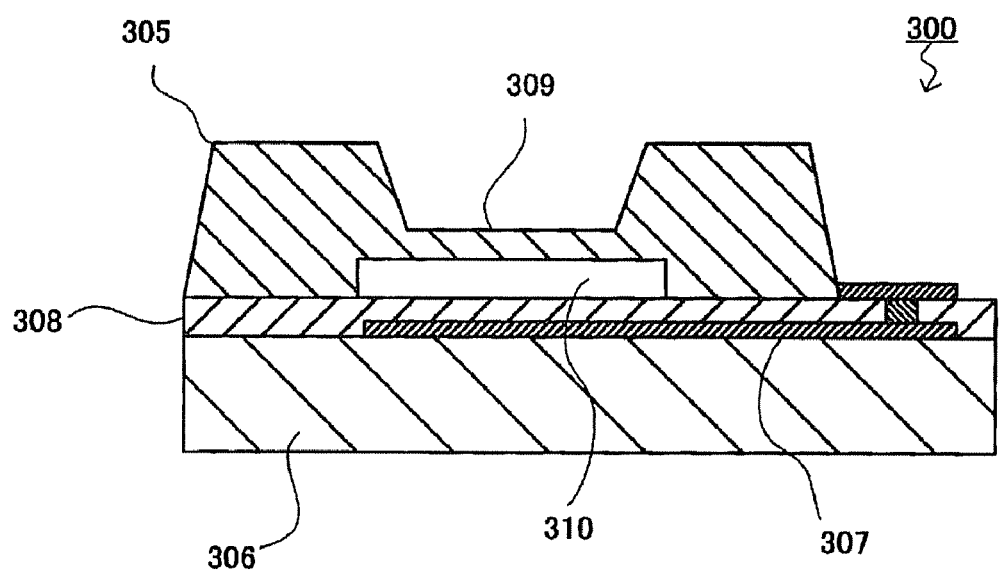
FIG. 22 is a schematic view showing a pressure sensor according to a second related art.

Each of the embodiments is described on the premise that the pressure receiving means is a diaphragm. However, not limited to this, the pressure receiving means may be a bellows 150. FIG. 20 shows a modification in which the bellows 150 is applied as the pressure receiving means to the first embodiment. The bellows 150 includes a central region 150a, a flexible region 150b, and a marginal region 150c. The central region 150a is displaced by pressure of the outside. The flexible region 150b is connected to a circumference of the central region and is elongated and contracted in response to pressure of the outside. The marginal region 150c is connected to a circumference of the flexible region 150b and connected to the opening 22. The displacement of the central region 24a of the diaphragm 24 is not changed by temperature change, but the displacement in expansion and contraction direction of the bellows 150 is changed by temperature change. Therefore, an effect for suppressing pressure error accompanied by the temperature change is not as large as the diaphragm, but a shape of the pressure receiving means can be changed depending on the intended use.

INDUSTRIAL APPLICABILITY

The present invention has industrial applicability as a pressure sensor which can avoid an error in a pressure measurement value, which is accompanied by temperature change and caused by different linear expansion coefficients of a pressure sensing element and a housing made of different materials from each other, because a first base portion at one end in a detection axis direction of the pressure sensing element is coupled to a central region, which is displaced by pressure from the outside, of a diaphragm, and a second base portion disposed at the other end, which is an opposite end to the one end, is fixed to the housing or coupled to a marginal region, which is not displaced by pressure from the outside, of the diaphragm through a connecting means.

What is claimed is:

1. A pressure sensor, comprising:
   a housing;
   a pressure receiver sealing an opening of the housing and including a flexible portion of which one main surface is a pressure receiving surface and a marginal region positioned outside the flexible portion; and
   a pressure sensing element including a pressure sensing portion, a first base portion, and a second base portion, the first base portion and the second base portion being respectively connected to both ends of the pressure sensing portion and arranged in a direction parallel to a displacement direction of the pressure receiver, wherein the first base portion is coupled to a central region of the pressure receiver, the central region being a reverse side of the pressure receiving surface, and the second base portion is coupled to one of the marginal region of the reverse side and an inner wall of the housing, the inner wall being opposed to the first base portion, through a connector.

2. The pressure sensor according to claim 1, wherein the connector has a pair of supporting plates extending from the second base portion and sandwich the pressure sensing portion.

3. The pressure sensor according to claim 1, wherein the first base portion is coupled to a fixing part provided to a center of the flexible portion.

4. The pressure sensor according to claim 1, wherein the first base portion is coupled to the connector through a reinforcing part.

5. The pressure sensor according to claim 1, further comprising:
   a reaction force generating part coupled to the pressure receiver and applying force in a direction reverse to gravity to the pressure receiving part by using a leveraged weight, the gravity being applied to the pressure receiver.

6. The pressure sensor according to claim 5, wherein the reaction force generating part is formed as a pair and sandwiches the pressure sensing element.

7. The pressure sensor according to claim 6, wherein a metal film is disposed on a surface of the leveraged weight.

8. The pressure sensor according to claim 5, wherein a metal film is disposed on a surface of the leveraged weight.

9. The pressure sensor according to claim 1, wherein the housing is integrally molded by metal squeezing.

10. The pressure sensor according to claim 1, wherein the housing includes a second opening formed opposed to the opening and sealed by a second pressure receiver, and the pressure receiver and the second pressure receiver are coupled to each other through a force transmission shaft.

* * * * *